(12) United States Patent
Tompkins

(10) Patent No.: US 10,627,998 B2
(45) Date of Patent: *Apr. 21, 2020

(54) FACILITATING DATA SCIENCE OPERATIONS

(71) Applicant: Adobe Inc., San Jose, CA (US)

(72) Inventor: David Tompkins, Menlo Park, CA (US)

(73) Assignee: ADOBE INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/155,580

(22) Filed: Oct. 9, 2018

(65) Prior Publication Data

US 2019/0042068 A1 Feb. 7, 2019

Related U.S. Application Data

(63) Continuation of application No. 15/197,793, filed on Jun. 30, 2016, now Pat. No. 10,133,452.

(51) Int. Cl.
| | |
|---|---|
| G06F 3/048 | (2013.01) |
| G06F 3/0482 | (2013.01) |
| G06T 11/20 | (2006.01) |
| G06F 3/0484 | (2013.01) |
| G06F 16/25 | (2019.01) |
| G06F 40/205 | (2020.01) |

(52) U.S. Cl.
CPC ........ G06F 3/0482 (2013.01); G06F 3/04847 (2013.01); G06F 16/252 (2019.01); G06F 40/205 (2020.01); G06T 11/206 (2013.01)

(58) Field of Classification Search
CPC ...... G06F 3/0482; G06F 3/0484; G06F 17/27; G06F 17/30
See application file for complete search history.

(56) References Cited

U.S. PATENT DOCUMENTS

| | | | |
|---|---|---|---|
| 5,920,873 | A | 7/1999 | Van Huben et al. |
| 10,133,452 | B2 | 11/2018 | Tompkins |
| 2006/0101224 | A1 | 5/2006 | Shah et al. |
| 2007/0143302 | A1 | 6/2007 | Stone |
| 2011/0131546 | A1 | 6/2011 | Elaasar |
| 2012/0078968 | A1 | 3/2012 | Nixon |
| 2014/0359604 | A1 | 12/2014 | Salameh et al. |
| 2016/0232457 | A1 | 8/2016 | Gray et al. |
| 2017/0017903 | A1 | 1/2017 | Gray et al. |

(Continued)

OTHER PUBLICATIONS

U.S. Appl. No. 15/197,800, Mar. 6, 2019, Notice of Allowance.

(Continued)

*Primary Examiner* — David E Choi
(74) *Attorney, Agent, or Firm* — Keller Jolley Preece

(57) ABSTRACT

The present disclosure is directed to performing data science operations. In particular, the present disclosure relates to a data science system that improves data science operations as well as enhances a user's experience in performing data science operations. For example, the data science system provides an improved framework that enables a data source to be paired with one or more algorithms to create a data science operation. In many instances, the data science operation outputs visual results, such as charts and graphs, that are easy for the user to understand. Further, using the framework, the data science system provides tools that enable the user to further customize data science operations.

20 Claims, 15 Drawing Sheets

(56) References Cited

U.S. PATENT DOCUMENTS

2017/0053357 A1   2/2017   Bowman et al.
2018/0004784 A1   1/2018   Tompkins

OTHER PUBLICATIONS

U.S. Appl. No. 15/197,793, Apr. 6, 2018, Preinterview 1st OA.
U.S. Appl. No. 15/197,793, Jul. 11, 2018, Notice of Allowance.
U.S. Appl. No. 15/197,800, Aug. 16, 2018, Preinterview 1st OA.

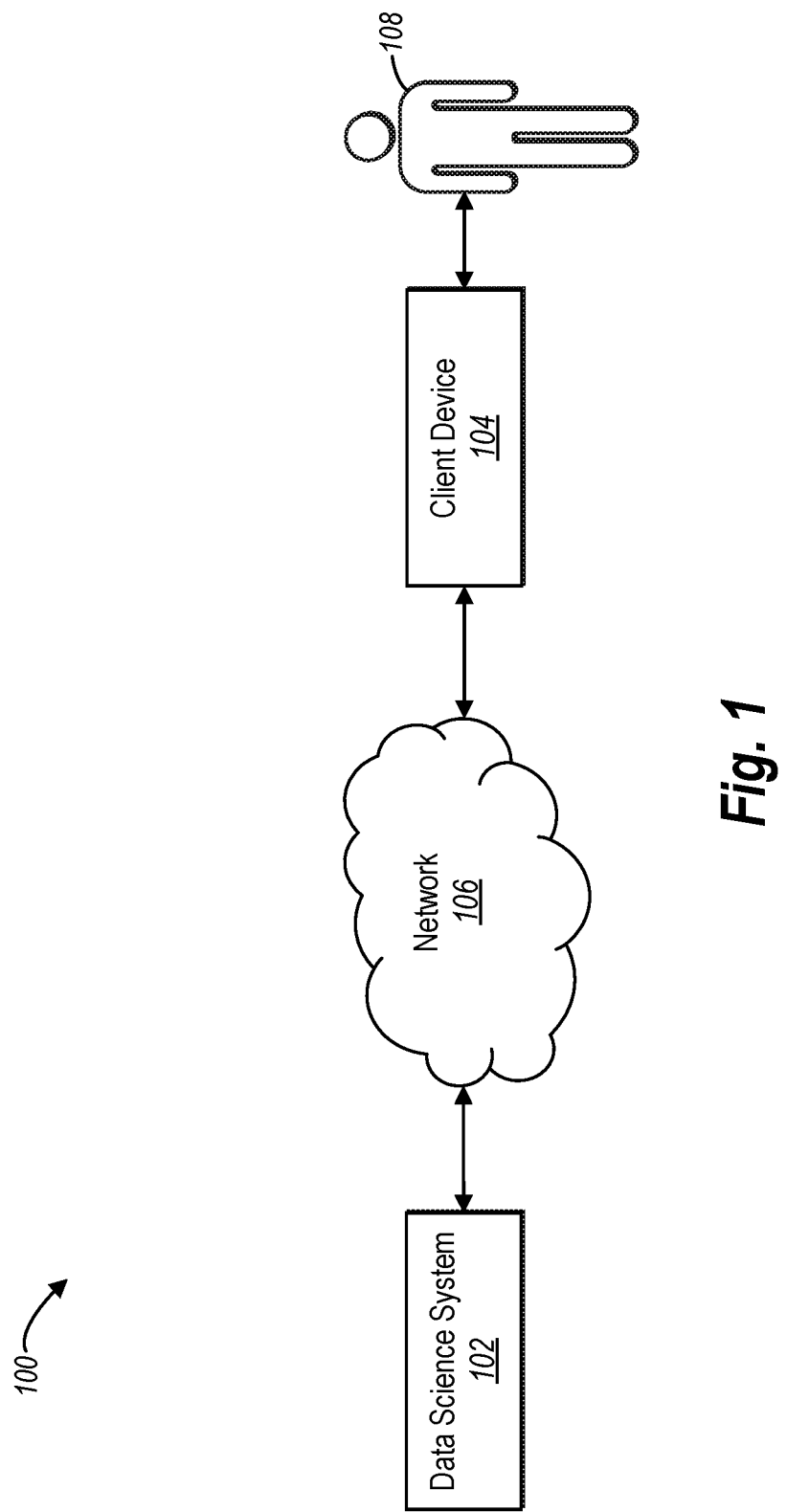

200 — Data Platform | Designer | Data Sources | Services | ☐ Joe Blake ⋮⋮⋮ ❓ 👤
202 —
204 —
206 —

Data Sources 212 — 218

🔍 Find a data source...

- Clicks
- G2NAComplaint
- Link Hovers
- MDPComplaint
- Attribution Dataset
- Sales Dataset
- 10Q Survey Dataset
- Customer Satisfaction Questions
- Focus Group Dataset
- Social Network Dataset

Actions 214

🔍 Find an action...

- Frequency Distribution Table
- Attribution Analysis
- Campaign Caps
- Day of Week Spend
- Delayed Revenue
- Geo Analysis (USA)
- Mobile Optimization
- Normalized SIM (Combined)
- Portfolio Anomaly Detection
- Portfolio Pre/Post
- Quality Score
- Query Cross Matching
- Search Engine Spend
- Segment Demographics
- Settings Audit
- Time-of-Day Analysis ⬇ Load  💾 Save  ⚙ Deploy as Service  ▶ Run  ⏹ Stop  🕘 Job History

Test and Deploy 216

Selected Data

Code
```
1  // selected data sources will be loaded into a spark DataFrame and
   // injected as variable dataFrame.
2  // assign computation results to val result for graph support
3
4
```
➕ Save Code as Action Output A Text View | 📊 Graph View

Data Platform  Designer  Data Sources  Services  Joe Blake  Deploy as Service  Job History

Data Sources 212  Find a data source...

∨ Clicks 218

Description: Tracks click data for visitors on one or more websites.
Creation Date: 2014-10-31 00:00:00
Updated: 2016-05-10 06:16:13
Available Data Blocks: 3308

View Schema 226

Data Selection:
Start Time: 2016-04-30 17:00    End Time: 2016-04-30 18:00
Selected Hours: – 1 +
Selection Range: 227    Use ∨ G2NAComplaint
∨ Link Hovers
∨ MDPComplaint
∨ Attribution Dataset
∨ Sales Dataset
∨ 10Q Survey Dataset
∨ Customer Satisfaction Questions
∨ Focus Group Dataset
∨ Social Network Dataset

Actions 214  Find an action... 228

∨ Frequency Distribution Table
∨ Attribution Analysis
∨ Campaign Caps
∨ Day of Week Spend
∨ Delayed Revenue
∨ Geo Analysis (USA)
∨ Mobile Optimization
∨ Normalized SIM (Combined)
∨ Portfolio Anomaly Detection
∨ Portfolio Pre/Post
∨ Quality Score
∨ Query Cross Matching
∨ Search Engine Spend
∨ Segment Demographics
∨ Settings Audit
∨ Time-of-Day Analysis Load  Save  Run  Stop

Test and Deploy 216

Selected Data

Code  + Save Code as Action
1  // selected data sources will be loaded into a spark DataFrame and
2  // injected as variable dataFrame.
3  // assign computation results to val result for graph support
4

A Text View  Graph View

Output

Data Platform | Designer | Data Sources | Services

Joe Blake

Data Sources 212

- Clicks — 218
  Description: Tracks click data for visitors on one or more websites.
  Creation Date: 2014-10-31 00:00:00
  Updated: 2016-05-10 06:16:13
  Available Data Blocks: 3308

View Schema

Data Selection:
  Start Time: 2016-04-30 17:00
  End Time: 2016-04-30 18:00
  Selected Hours: 1
  Selection Range:

Use

- G2NAComplaint
- Link Hovers
- MDPComplaint
- Attribution Dataset
- Sales Dataset
- 10Q Survey Dataset
- Customer Satisfaction Questions
- Focus Group Dataset
- Social Network Dataset Find a data source... — 220

Actions 214

Find an action...

- Frequency Distribution Table — 228  230
  Description: This Action computes the frequency distribution of the geo_country field in Analytics data.
  Created by: David Johnson
  Language: scala
  Version: 1.0
  Last Updated: 2015-11-24 12:28:58 val result = data.Frame.groupBy("geo_country").count().where($"geo_country" !== "").orderBy($"count".desc).take(10) — 232
  // graph:type:bar
  // graph:title:Top 10 Source Countries for Analytics Hits — 236

233

234

240 — Use   Delete — 238

- Attribution Analysis
- Campaign Caps
- Day of Week Spend
- Delayed Revenue
- Geo Analysis (USA)
- Mobile Optimization
- Normalized SIM (Combined)
- Portfolio Anomaly Detection
- Portfolio Pre/Post
- Quality Score
- Query Cross Matching

Test and Deploy 216

Load | Save | Deploy as Service | Run | Stop | Job History

Selected Data
Clicks : 2016-04-30 17:00 - 2016-04-30 18:00

+ Save Code as Action

Code
```
1  // selected data sources will be loaded into a spark DataFrame and
2  //   injected as variable dataFrame.
3  // assign computation results to val result for graph support
4  // this code computes the frequency distribution of the geo_country field
5  //   in Analytics data
6  val result = data.Frame.groupBy("geo_country").count().where($"geo_country" !== "").orderBy($"count".desc).take(10)
7
8  // graph:type:bar
9  // graph:title:Top 10 Source Countries for Analytics Hits
```

Output

A Text View | Graph View

*Fig. 2C*

Data Platform    Designer    Data Sources    Services —260       256   258   Joe Blake   ⋮⋮⋮ ❓   ⟳ Job History

Data Sources 212

⌕ Find a data source....

⌄ Clicks—218     ▦ View Schema

Description:
Tracks click data for visitors on one or more websites.

Creation Date: 2014-10-31 00:00:00
Updated: 2016-05-10 06:16:13
Available Data Blocks: 3308

Data Selection:

Start Time:     End Time:
2016-04-30 17:00 📅   2016-04-30 18:00 📅

Selected Hours:
[−] 1 [+]

Selection Range:
|—————————|    ⬆ Use

⌄ G2NAComplaint
⌄ Link Hovers
⌄ MDPComplaint
⌄ Attribution Dataset
⌄ Sales Dataset
⌄ 10Q Survey Dataset
⌄ Customer Satisfaction Questions
⌄ Focus Group Dataset
⌄ Social Network Dataset

Actions 214

⌕ Find an action....

⌄ Frequency Distribution Table—228

Description:
This Action computes the frequency distribution of the geo_country field in Analytics data.
Created by: David Johnson
Language: scala
Version: 1.0
Last Updated: 2015-11-24 12:28:58 val result = data.Frame.groupBy("geo_country").count().where($"geo_country" !=="").orderBy($"count".desc).take(10)
// graph:type:bar
//graph:title:Top 10 Source Countries for Analytics Hits ⬆ Use   🗑 Delete ⌄ Attribution Analysis
⌄ Campaign Caps
⌄ Day of Week Spend
⌄ Delayed Revenue
⌄ Geo Analysis (USA)
⌄ Mobile Optimization
⌄ Normalized SIM (Combined)
⌄ Portfolio Anomaly Detection
⌄ Portfolio Pre/Post
⌄ Quality Score
⌄ Query Cross Matching ⬆ Load   💾 Save   ⚙ Deploy as Service   ▶ Run   ⬛ Stop

Test and Deploy 216 —248

Selected Data —242
Clicks : 2016-04-30 17:00 - 2016-04-30 18:00     ✕

＋ Save Code as Action

Code —244
```
1  // selected data sources will be loaded into a spark DataFrame and
2  //   injected as variable dataFrame.
3  // assign computation results to val result for graph support
4  // this code computes the frequency distribution of the geo_country field
5  //   in Analytics data
6  val result = data.Frame.groupBy("geo_country").count().where($"geo_country" !=="").orderBy($"count".desc).take(10)
7  // graph:type:bar
8  // graph:title:Top 10 Source Countries for Analytics Hits
9
```

Output —246    A Text View   ▮▮▮ Graph View  —250 endTime : java.util.Date = May 12 00:04:08 GMT 2016
---- Complete (May 12 00:04:08 GMT 2016) ----
elapsedTime: Double = 27.543
---- Elapsed Time (27.543 sec) ----
warning: there were 1 deprecation warning(s); re-run with -deprecation for det
[0129 00:04:08.998031 2835 sched.cpp:1805] Asked to stop the driver
[0129 00:04:08.998170 2526 sched.cpp:1043] Stopping framework '6015c82
Job completed, id: 381

Data Platform

Designer | Data Sources | Services

Joe Blake

Data Sources 212

Find a data source...

- Clicks — 218
- G2NAComplaint
- Link Hovers
- MDPComplaint
- Attribution Dataset
- Sales Dataset
- 10Q Survey Dataset
- 20Q Survey Dataset
- Customer Satisfaction Questions
- Focus Group Dataset
- Social Network Dataset

Actions 214

Find an action...

- Frequency Distribution Table
- Attribution Analysis
- Campaign Caps
- Day of Week Spend
- Delayed Revenue
- Geo Analysis (USA)
- Mobile Optimization
- Normalized SIM (Combined)
- Portfolio Anomaly Detection
- Portfolio Pre/Post
- Quality Score
- Query Cross Matching
- Search Engine Spend
- Segment Demographics
- Settings Audit
- Time-of-Day Analysis

Test and Deploy 216

Load | Save | Deploy as Service | Run | Stop

Selected Data

Code + Save Code as Action

```
1  // selected data sources will be loaded into a spark DataFrame and
   // injected as variable dataFrame.
2
3  // assign computation results to val result for graph support
4
```

Output

A Text View | Graph View

*Fig. 5A*

FACILITATING DATA SCIENCE OPERATIONS

CROSS REFERENCE TO RELATED APPLICATIONS

The present application is a continuation of U.S. application Ser. No. 15/197,793 filed Jun. 30, 2016. The aforementioned application is hereby incorporated by reference in its entirety.

BACKGROUND

Data science, in general terms, is the extraction of information from large volumes of unstructured data, called data sets. Because of the complexities and large amounts of data involved in data science operations, experts, such as trained data scientists, are typically needed to perform operations on these massive data sets. Further, trained data scientists commonly require sophisticated computing processes, hardware, and software to perform data science operations. Even with the proper tools and instruments, data scientists still face numerous challenges when working with large data sets and preforming data science operations.

To illustrate, to work with a large data set, a data scientist must first provision a dedicated storage space for the data set. Even with recent advancements in computer storage, finding dedicated storage space for large data sets can be difficult. Next, the data scientist must manually clean the data, which can involve editing the formatting and structure of thousands of lines of data to ensure proper readability of the data set. Then, upon cleaning the data set, the data scientist can run algorithms on the data. Before running a data science algorithm, however, the data scientist often needs to manually program (i.e., code) the algorithm, which requires the data scientist to be knowledgeable in computer programming.

The advent of general-purpose frameworks for large-scale data science computations has improved data science by standardizing and simplifying the above described process of handling large data sets. Nevertheless, data scientists using complicated processes are still needed in order to operate on data and implement algorithms. Further, while many data science techniques include elements that are becoming more standardized (e.g. data cleaning and/or normalization), these general-purpose frameworks remain too complex to enable many users, including data scientists to successfully use these frameworks.

As such, in the field of data science, there remains a need for an improved framework to perform data science operations. In particular, current data science techniques require large computing power and timeframes and are otherwise inefficient and inflexible. These and other problems exist with regard to current and traditional data science techniques.

BRIEF SUMMARY

Embodiments of the present disclosure include systems and methods that provide a dynamic data science system that intelligibly updates based on a user's selection of a data source. More specifically, the systems and methods disclosed herein analyze and organize data sources and data science algorithms so as to provide a framework for users to easily perform data science operations. In some embodiments, the systems and methods generate a graphical user interface that provides access to this framework, and in particular, provide access to the data sources and data science algorithms.

To briefly illustrate, the systems and methods display a listing of data sources and data science algorithms as part of a data science framework. Upon receiving a selection of a data source, the systems and methods identify a schema for data source. Using the identified schema, the systems and methods determine compatible data science algorithms matching the schema. With a listing of compatible data science algorithms, the systems and methods update the framework to pair the selected data source with the compatible data science algorithms, which in some embodiments, includes updating the graphical user interface to display the filtered list of compatible data science algorithms. Just as the systems and methods update the framework based on a selected data source, the systems and methods can also dynamically update the framework to include data sources that are compatible with a selected data science algorithm (when the data science algorithm is selected first). Thus, one or more embodiments provide an intelligent framework that beneficially improves the functionality of managing data sources and data science algorithm. Further, as a result of the improved framework, the systems and methods enables any level of user assemble data science operations using compatible data sources and data science algorithms.

Upon pairing a data source with a data science algorithm, the disclosed systems and methods use the framework to create a data science operation. In particular, the framework enables the systems and methods to create a data science operation from algorithm building blocks of the selected data science algorithm, inject data from the selected data source into the data science algorithm, and generate a result or an analysis of the data. In additional embodiments, the disclosed systems and methods framework provides further improvements, such as tools to further customize the data science operation.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIG. 1 illustrates an example schematic diagram of an example environment in which the data science system operates in accordance with one or more embodiments;

Figure 2E:
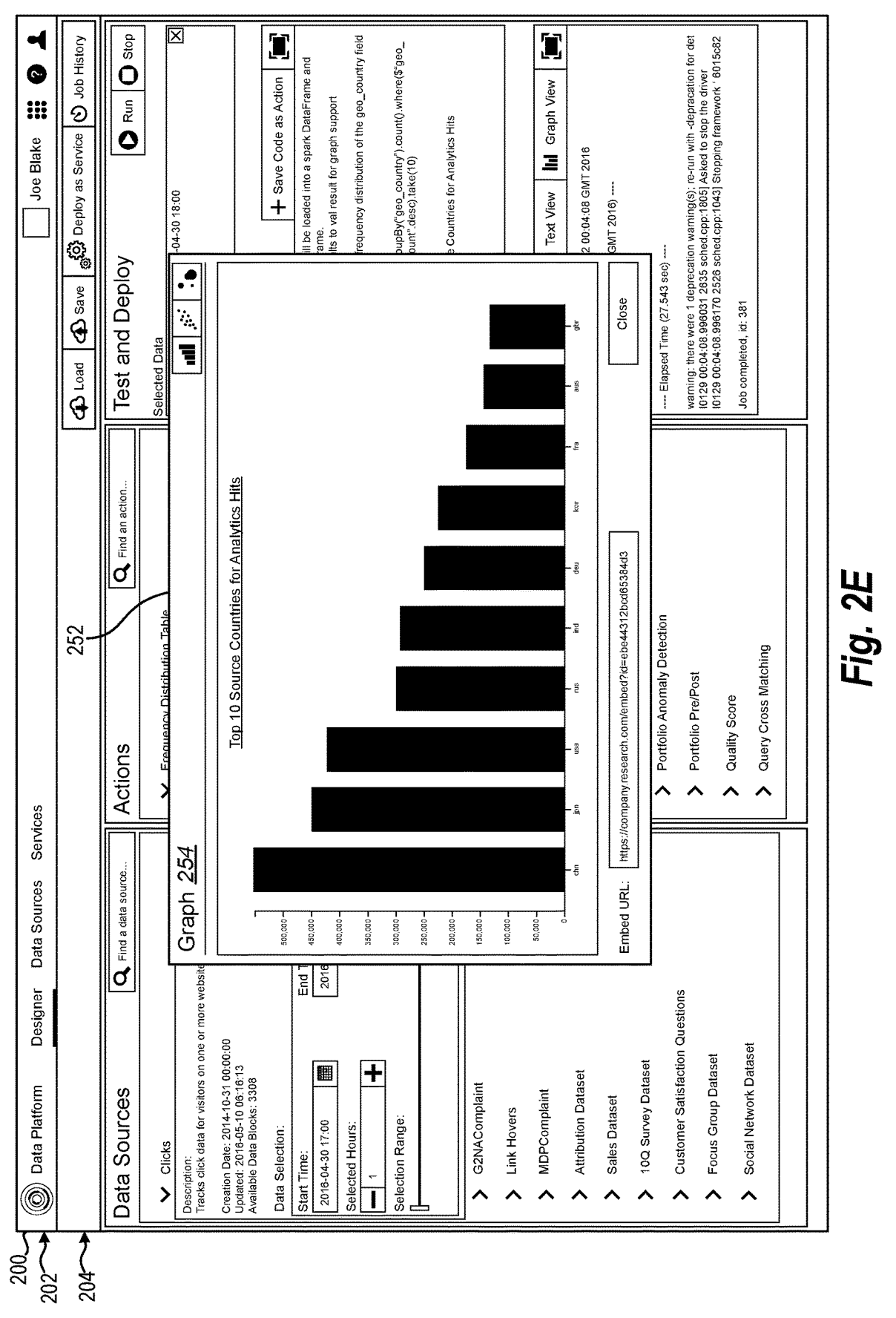

FIGS. 2A-2F illustrate example graphical user interfaces of the data science system that enable a user to create and perform a data science operation in accordance with one or more embodiments;

FIGS. 5A-5B illustrate example interactive graphical interfaces showing the data science system dynamically updating based on a user selection in accordance with one or more embodiments;

DETAILED DESCRIPTION

Figure 2F:
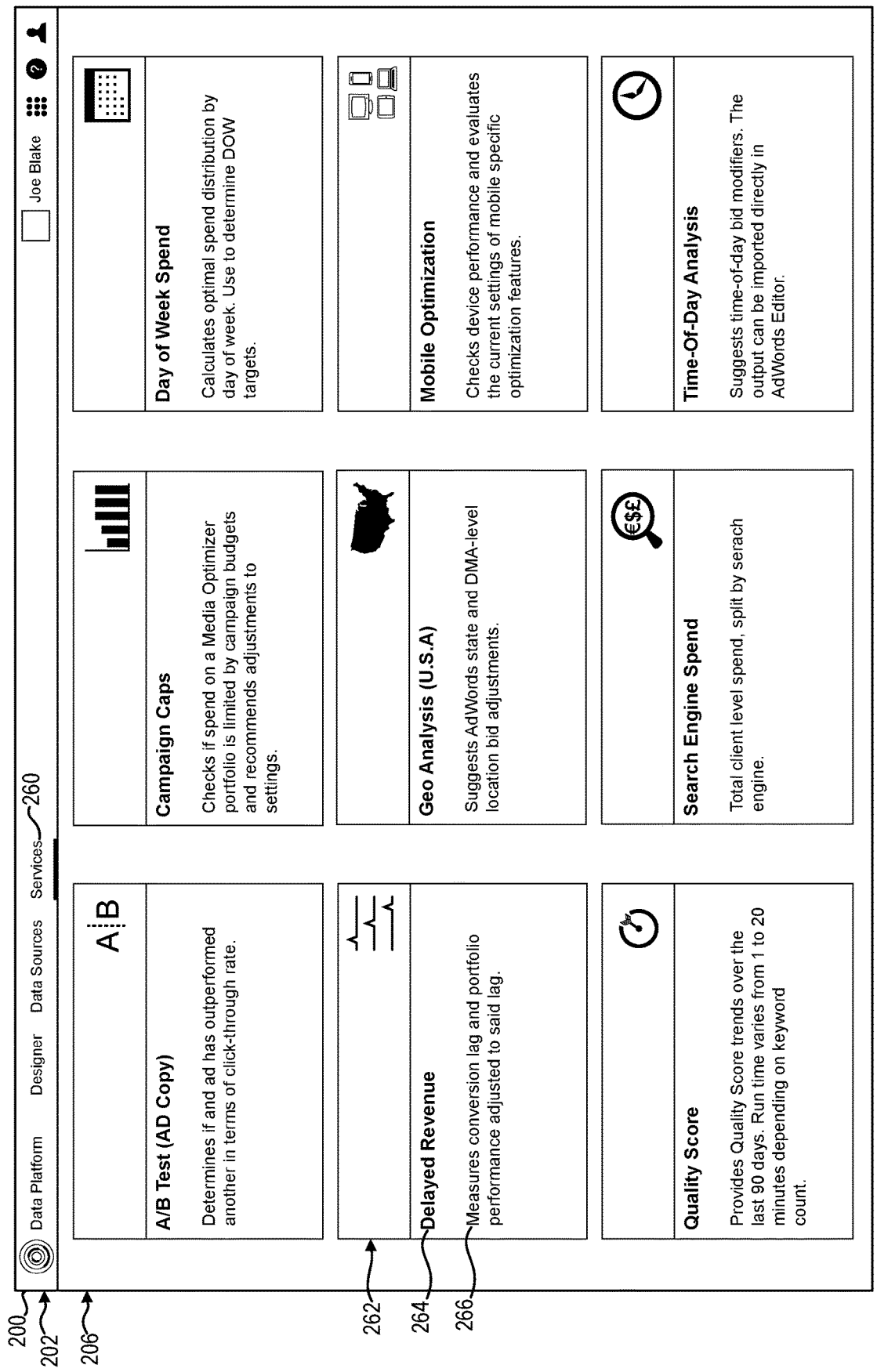

One or more embodiments of the present disclosure include a data science system that provides a framework for analyzing, organizing, and managing data sets in connection with data science algorithms such that any user can use the framework to perform data science operations. As such, the data science system disclosed herein enables users, such as untrained and trained data scientists alike, to more easily create and perform one or more data science operations. For example, the data science system disclosed herein provides an intelligent framework that improves the workflow of performing data science operations. As a result, the data science system described herein, enables any user to easily obtain data science results and output that otherwise would be too complex and difficult for that user to obtain.

To illustrate, in one or more embodiments, the data science system provides an improved framework that organizes data sources (e.g., data sets) and actions (e.g., data science algorithms). The framework provides a workflow that guides the user through the process of selecting data sources and corresponding actions, which the data science system uses to create and execute a data science operation. In particular, the data science system builds a data science algorithm from reusable algorithmic building blocks in real-time and injects (e.g., insert into the appropriate locations based on data types and data structures) data from the selected data sources into the data science algorithm to create a data science operation. After generating the data science operation, the data science system runs the data science operation to obtain one or more desired results. In some instances, the data science system provides a visual output (e.g., graphs, charts, plots) to the user within a graphical user interface. As described further below, the data science system often provides a graphical user interface to users that enable users to access the framework and run data science operations.

As used herein, the term "reusable algorithm building block" generally refers to a collection of components that can be leveraged to create a set of data science algorithms. For example, the data science system combines multiple reusable algorithmic building blocks to form a single data science algorithm. Further, the same reusable algorithmic building block can be used to in the construction of multiple data science algorithms. Each reusable algorithm building block is often constructed from computer code, such as Scala or Python, which is often pre-compiled and ready to execute (after the appropriate data source is added). In general, trained data scientists create reusable algorithmic building blocks, however, other users can also create, modify, and/or update a reusable algorithmic building block.

In addition, each reusable algorithm building block includes annotations to create a data science algorithm. For instance, annotations in a reusable algorithm building block indicate required and optional data types, which are then included in portions of a data science algorithm created from the reusable algorithm building block. Using the reusable algorithm building blocks, the data science system can build tools and services that simplify data science operations and make data science algorithms more accessible to laypeople in addition to improving the speed needed to perform data science operations.

In some embodiments, as part of generating a data science operation, the framework of the data science system includes tunable parameters that can vary the outcome of a data science operation, based on user input modifying at least one or more of the identified tunable parameters. For example, the data science system identified a required parameter in the framework needed to complete operation of a data science operation, and prompts the user to enter the required parameter (e.g., to replace a null value). As another example, the data science system enables a user to modify at least one or more default parameters.

As part of the improved framework, in some embodiments, the data science system provides testing and deployment of a data science operation. For example, the data science system displays a graphical user interface that includes a testing and deployment area, and the data science system displays the created data science operation in this area. For instance, the data science system provides generated computer language code that shows the generated algorithm and allows user input to modify portions of the code. Further, the testing and deployment portion allows for modifications and multiple iterations of a data science operation, until the data science system achieves a desired output. Once the data science system achieves the desired result, the framework of the data science system allows for packaging the data science operation for later use.

In one or more embodiments, the framework of the data science system facilitates a graphical user interface that dynamically updates to further simplify the process of creating and running a data science operation. For example, upon a user selecting a data source, the data science system filters the listing of actions to only display compatible actions. In particular, the data science system matches schema data from the selected data source with compatible descriptors associated with actions to determine which compatible actions to show. In this manner, the data science system filters the list of actions to actions that are operational with data in a data source, which are then displayed in the graphical user interface. If the user changes data source selections or selects an additional data source, the data science system updates the listing of compatible actions as well as updates the graphical user interface. In an alternative example, upon a user selecting an action, the data science system similarly filters the listings of data sources and displays data sources that are operational with the selected action.

In various embodiments, the framework of the data science system enables the data science system to communicate and integrate data (e.g., data sources and/or data science algorithms) with other databases or resources. One example is a service catalog or marketplace, where, due to the framework integration, a user can browse and select a data science package to perform on the data science system with the user's own data sources. For example, when a user packages a data science operation as a data science package, the data science system creates a data science package structured to integrate with the service catalog. As such, if a user uploads their saved packages to a marketplace, other users can purchase and/or use the data science packages. In one or more embodiments, a service catalog and/or marketplace includes third-party data science packages created by other users and/or data scientists. As such, a user can employ a third-party data science package to discover new insights about user's own data. In some cases, the data science system uses the framework to filter the selection of third-party data science packages and displays and/or highlights data science packages that are on compatibility with the user's data sources.

The data science system provides a number of benefits over traditional data science systems. As one example, the data science system provides actions that include reusable algorithmic building blocks to simplify data science operations and make the operations more accessible to all users, including novice users. A significant advantage of reusable packaged services is each individual user can use and customize a data science algorithm using only a single selected action in connection with their own data sources. As such, when integrated in the improved framework, users can perform data science operations without being trained as a data scientist or as a computer programmer.

In addition, using reusable algorithmic building blocks provides improved efficiency and flexibility to a computing device or a computing system. For example, a computing device can quickly assemble a data science algorithm using a combination of reusable algorithmic building blocks, rather than needing to compile numerous integrations of computer code, which requires additional memory capacity and increased processing time. Further, using reusable algorithmic building blocks enables a computing device to quickly perform on-the-fly processing of a data science algorithm, and in turn, a data science operation.

As another benefit, the data science system only requires a minimal operating system to start a data science operation and monitor its execution. For example, conventional systems require a complex interworking of devices to process large amounts of data science data. However, because the data science system provides a framework that simplifies the process of creating and performing data science algorithms and data science operations, only a minimal operating system is needed to execute data science operations, even when processing large amounts of data.

As mentioned above, in some embodiments, the data science system provides a framework that facilitates an interactive visual model that displays recommendations of data science algorithms and that can be paired to appropriate data sources belonging to the user. After the user performs a selection of a data source, the data science system automatically injects data from a selected data source into data science algorithms. Accordingly, the data science system presents a user with a simplified integrated development environment for data science that leverages the underlying data platform to enable simplified functions such as algorithm recommendations, visualization recommendations, and data science packages for later use.

In these embodiments, the data science system enables a computing device or computer system to reduce memory requirements and increase processing efficiency. For example, because the data science system filters data sources and/or data science algorithms upon a user's selection, a computing device requires less memory and processing power to display the remaining options. Further, because less options exist, the computing device can search and look-up a user's selection from the filtered options more quickly because the computing device needs to sift through less options.

In addition, in one or more embodiments, the data science system facilitates an interactive graphical user interface that improves the performance of the computing device displaying the interface. In particular, the graphical user interface can dynamically update based on a user's interaction to display options more concisely. For example, as mentioned above, the data science system filters out data sources and/or data science algorithms based on a user selection. As part of the filtering process, the data science system reduces the amount of options presented in the graphical user interface. As such, a computing device displaying the graphical user interface requires less processing to display the remaining filtered options.

Additional features and characteristics of one or more embodiments of a document organization system are described below with respect to the Figures. For example, FIG. 1 illustrates an exemplary environment 100 in which the data science system 102 operates. The environment 100 includes the data science system 102 communicating with a client device 104 via a network 106. While not illustrated, the data science system 102 can operate on one or more computing devices, such as one or more server devices. Additional components and features of the environment 100 are described in connection with FIG. 9.

The environment 100 also includes a user 108. The user 108 can be a novice user (e.g., a layperson) who is not a trained data scientist or computer programmer. Alternatively, the user can be a trained, or semi-trained data scientist. The data science system 102 uses a framework and workflow to enable the user 108, via the client device 104, to perform data science operations.

To illustrate, as one example, the data science system 102 organizes data sources belonging to a user along with data science algorithms within a framework. The data science system 102 uses the framework to facilitate an intelligent graphical user interface that provides the data sources and actions (e.g., data science algorithms). Based on the user selections, the data science system 102 creates a data science algorithm that performs a data science operation using the selected data. The framework of the data science system 102 also allows for customizable and tunable parameters to be set during the creation of at least one data science operation. In one or more instances, when the user 108 selects a data source, the data science system 102 uses the selection to identify compatible actions, which are then displayed within the graphical user interface. In some instances, upon the user 108 selecting a data source, the data science system 102 provides at least one recommendation of compatible actions to the user 108.

As mentioned above, the term "data science" generally refers to extraction of information from large volumes of unstructured data. Data science can also include extracting information from structured data as well. The term "data science operation" generally refers to analyzing the large amounts of raw or structured data according to one or more data science algorithms to achieve a result, which provides knowledge and insights from the analyzed data. A "data science algorithm" is a set of steps that, when followed, solve a data science question or complete a data science process. In general, a data science algorithm receives the raw (i.e., unstructured) data from a data source as input and outputs processed data in the form of a result.

Additionally, the data science system 102 connects with a service catalog and/or marketplace that includes available data science packages. Each data science package includes a brief description that fit into the framework of the data science system 102. In addition, the brief description also assists the user 108 in selecting a package. Upon the user 108 selecting a data science package, the data science system 102 uses the workflow provided by the framework to guide the user in selecting data from a data source to apply to the data science operation such that the user obtains a result. Additionally, the data science system 102 can help the user 108 customize the selected operation and/or setting up a recurring schedule.

FIGS. 2A-2F illustrate example graphical user interfaces that show how the data science system enables a user to create and perform a data science operation. The data science system and the user referred to in FIGS. 2A-2F can be example embodiments of the data science system 102 and the user 108 described with respect to FIG. 1. For example, the data science system 102 uses the framework described herein to facilitate the graphical user interface described in connection with FIGS. 2A-2F. Further, the client device 104 described above, or another computing device, can display the graphical user interfaces shown in FIGS. 2A-2F.

To illustrate, FIG. 2A shows a graphical user interface 200 of the data science system. In particular, the graphical user interface 200 displays a data platform provided by the data science system according to the framework. The graphical user interface 200 includes various areas, such as a header 202, a toolbar 204, and a body 206. The header 202 includes navigational elements, user information, and user preferences as well as links to data source settings and services. The header 202 can include additional or fewer elements than shown. The toolbar 204 provides tools and selectable options to a user, described further below, that enhance the user's experience with the data science system. The body 206 of the graphical user interface 200 includes sections such as a data sources section 212, actions section 214, and test and deploy section 216. Each section of the body is described in additional detail below.

As shown within the body 206, the data sources section 212 provides the user with a listing of data sources. The data sources, in general, are data sets belonging to, or accessible by, the user. As an example, a user may employ a service that collects click event data on one or more websites. As the service collects click event data, the service can provide the data to the data science system, shown as "Clicks 218" in the data sources section 212. Alternatively, rather than using a third-party service to collect data, the data science system can directly collect data for a user.

In addition to the Clicks 218 data source, the user can obtain other types of data. Other examples of data types in keywords searches, survey responses, customer feedback, user behavior modeling, sales data, web traffic data, or other analytics data. As shown in FIG. 2A, the data sources section 212 includes a number of data sources that include a range of collected data. Accordingly, the user can select one or more data sources from the list of data sources.

As mentioned above, data science involves processing and analyzing large volumes of data. By way of explanation, each data source individually contains large amounts of data. Often, a data source includes potentially hundreds of billions of data entries, with each entry itself including numerous pieces of data. For example, if the user runs a merchant website, the Clicks 218 data source can include, for each click event, location data of the visitor, timestamps of when a click occurs, the specific website the visitor is on at the time of the click, the product or link being clicked by the visitor, the device used by the visitor, and demographic information about the visitor (if available). Data within each data source can be organized and stored according to a variety of structures or schemas. Further, the Clicks 218 data source can group click events by visitor such that each time a particular visitor visits the website, click event data is collected, even across multiple browsing sessions by the visitor. Thus, as click data is collected over time, and for a number of visitors, the size of the Clicks 218 data source grows.

Each data source in the data source section 212 is organized according to a data source schema. As used herein, a "schema" is a logical way to group and structure objects. A schema can be applied to a data source, an algorithm, a service, or another type of data organizer/analyzer. For example, a schema specifies how a particular data set inputs and outputs data. In general, schemas provide structure to data such that systems and/or parties can easily share data between each other. The data science system uses schemas as part of the framework that enables the data science system to easily create and run data science operations.

As used herein, the term "data source schema" generally refers to the organization of data within a data source. For example, a data source schema for the Clicks 218 data source specifies the data types, fields, and formats used to store click data, how the click data is structured, and how pieces of click data relate to one another. In addition, the data source schema for the Clicks 218 data source specifies how click data is organized. For example, the data source schema groups click data by the user (e.g., Visitor 34245) and/or by the object or link that triggered the click data (e.g., Product XYZ).

Using the data source schema, the data science system can inspect data in a data source. As mentioned above, the data source schema for a data source indicates the data types included in the data source and how the data is structured. As such, the data science system can use the data source schema to inject data from a data source into a data science algorithm or apply the data in a data source to a service. As part of injecting data, the data science system identifies where particular data types are needed (e.g., input variables) in a data science algorithm, identifies the matching data types from the data source, and properly inserts data from the data source in to the appropriate variables and/or locations. In some cases, the data science system uses annotations in the data source and/or data science algorithm to properly attach data from the data source to the data science algorithm. In addition, as described in greater detail below, the data science system can compare the data source schema to an input schema for a data science algorithm (e.g., a descriptor of an action) to determine whether the data source is compatible with the data science algorithm.

Each data source can include different data types, fields, and formats as indicated by a corresponding data source schema. In some embodiments, the data science system receives a data source schema when receiving a data source. If a data source schema is not provided, a user can create the data source schema for a data source. Alternatively, the data science system can automatically identify a data source schema for a data source.

Returning to FIG. 2A, a user desiring to perform data science operation selects a data source from the data source section 212. For example, the user selects the Clicks 218 data source. In some embodiments, when a user selects a data source, the data source expands to provide the user with additional information regarding the selected data source. Further, upon selecting a data source, the data science system enables the user to further specify the data the user desires to select.

To illustrate, FIG. 2B shows that after the user selects the Clicks 218 data source within the data source section 212, the graphical user interface 200 expands the data source section 212 to reveal additional data source information 220 with respect to the Clicks 218 data source. For example, within the additional data source information 220, the data science system provides a data source description 222 providing a brief summary of the data source. In some embodiments, the data source description 222 indicates the data type(s) being stored in the selected data source. The additional data source information can also display general data source information 223, which includes the creation date of the data source, the data source was last updated, and the number of data blocks or entries in the data source as shown.

As mentioned above, the data science system enables the user to refine his or her data source selection using the data selection 224. As shown, the data selection 224 allows a user to constrain which data blocks are used from the Clicks 218 data source based on start time and end time. The data selection 224 also allows the user to change the duration and/or range of click data used. For example, as shown, the user selects one hour of data from the Clicks 218 data source. One will appreciate that the options and customizations in the data selection 224 can include more or less options as well as vary based on the type of data in a data source. For example, while not shown, the data science system can also provide additional tools (e.g., a search field or expression field) that enable the user to filter the selected data.

In addition, upon selecting the Clicks 218 data source, the data science system can provide the data source schema 226 to a user. In one or more embodiments, selecting the data source schema 226 also displays a description of the data source schema to the user. In some embodiments, the data science system enables the user to edit the data source schema description or the data source schema itself.

If the user desires to use the selected data source, the user can confirm his or her selection by further selecting a data source confirmation option 227 (e.g., the "use button") within the additional data source information 220. After selecting a data source, the user then chooses an action from the actions section 214 to apply to the selected data source. For example, the user can select the action labeled "Frequency Distribution Table 228" (or simply "FDT 228"). The FDT 228 action provides the data science system with reusable algorithm building blocks that enable the data science system to create a data science algorithm that computes the frequency distribution of values within a data set field. The FDT 228 action is described further below.

As an overview, the actions section 214 includes a list of actions. Each action in the actions section 214 is associated with reusable algorithmic building blocks, described further below. Thus, when a user selects an action, the data science system uses reusable algorithmic building blocks corresponding to the selected action to build a data science algorithm that performs a data science operation. Further, in building the data science operation, the data science system injects the selected data source into the data science algorithm such that the selected data is used as part of the data science operation.

As shown in FIG. 2C, the actions section 214 illustrates a user selecting the FDT 228 action. Also as shown, selecting the FDT 228 action displays additional action information 230 with regard to the selected action. In particular, the additional action information 230 includes a description (i.e., action description 232) of the selected action. The action description 232 provides a brief summary of action. In some embodiments, the action description 232 also indicates required and optional data source inputs as well as output results of the action. The additional action information 230 also includes general action information 233, such as the creator of the action, the language in which the action is coded, the version of the action, and the last update of the action as shown.

The additional action information 230 also shows a code description 234 of one or more reusable algorithmic building blocks corresponding to the action. As illustrated, the code description 234 includes code snippets 236 of the action. Depending on the complexity of the action, the code snippets 236 can include the code itself, portions of the code, pseudo-code, or a high-level description of the code. The code snippets 236 also provide a listing of required and optional parameters, as well as which parameters are tunable (e.g., user customizable) parameters.

In addition to the code snippets 236, the action also displays output results 238. The output results 238 indicate whether the action produces a visual result, and if so, the type(s) of visual results available. Further, the output results 238 can include contextual information pertaining to the visual result (e.g., if the output is a bar graph, providing the title of the bar graph). Additionally, and/or alternatively, the output results 238 indicate that the output results 238 can be used as input in another action.

The information displayed in the additional action information 230 for an action can correspond to descriptor information from the action's reusable algorithm building blocks. By way of explanation, when a user selects an action, the data science system generates a data science algorithm using the action's reusable algorithm building blocks. In some embodiments, the data science system also generates a component descriptor that corresponds to the data science algorithm. For example, a component descriptor can include a brief explanation as to the purpose of the data science algorithm and how the data science algorithm is to be used. The component descriptor also describes what data types or data sources are needed to perform the data science algorithm and the expected output of the data science algorithm. In particular, the component descriptor describes expected input and output schemas of the data science algorithm (e.g., what the data science algorithm expects to observe in selected data sources for valid operation and what output the data science algorithm will deliver as output). In this manner, before creating and running a particular data science algorithm, the data science system uses the component descriptor to verify that a data source is compatible with a particular action as well as identify the types of visualizations and services the data science system can perform with the action's output.

Listing 1 below provides a sample component descriptor for the FDT 228 action. As mentioned above, the data science system provides a framework that employs the reusable algorithm building blocks from the FDT 228 action to create a data science algorithm that computes the frequency distribution of values within a data set field. In some embodiments, the component descriptor provides the reusable algorithm building blocks for a data science algorithm. In other embodiments, the data science system uses the component descriptor to transform a data science algorithm into reusable algorithm building blocks that can later be used for recreating the data science algorithm.

Of particular note, the component descriptor in Listing 1 includes a number of annotations that assist the data science system in effectively performing the FDT 228 action.

Listing 1

```
{
    "name": "Frequency Distribution Table",
    "version": "1.0.7",
    "type": "action",
    "lang": "scala",
    "descriptorVersion": "2.0.1"
    "description": "This action computes the frequency distribution
of a field in a dataframe, and provides the top N field values by
frequency",
    "parameters": {
        "selectedElement": {
            "type": "jsonpath",
            "label": "Selected Field",
            "placeholder": "Field Name",
            "default" : "geo_country"
        },
        "rankingsLength": {
            "type": "integer",
            "label": "Rankings Size",
            "placeholder": "Rankings Size (Top N)"
            "default" : 10
        }
    },
    "input": {
    "format" : "dataFrame",
        "required" : {
            "*" : "any" }
    },
    "output": {
        "items": {
            "type": "string[ ]",
            "label": "Array of ranked item values",
            "selector": "$ . . obj"
        },
        "counts": {
            "type": "integer[ ]",
            "label": "Array of item frequency counts",
            "selector": "$..count"
        }
    }
}
```

As shown in Listing 1, the parameters section of the component descriptor contains tunable algorithm parameters as detected by annotations within the data science algorithm code of the data science operation. In particular, the component description indicates a parameter that requires user input specifying the frequency distribution field and the number of ranked items to display. If the user does not provide values, however, the component descriptor indicates that the frequency distribution field defaults to the value of "geographic country" and the number of ranked items defaults to value of "10."

The input section in Listing 1 contains the expected format of the input data and required data types as detected by annotations within data science operation. In particular, the component descriptor indicates that a dataframe format (i.e., data type) is required to perform the frequency distribution, but that the input schema field may be any type. Note, the any type indication is specified using the wildcard "*" for the field name and the type "any" for the input schema field type in Listing 1. In some cases, the component descriptor specifies a more restrictive declaration, such as specifying a field by exact name and type, or a set of acceptable names and/or types. For example, the component descriptor specifies a declaration using a regular expression format.

The output section in Listing 1 defines the output schema of the data science operation. In particular, the component descriptor specified the output "type" field within the data science algorithm code of the data science operation. As shown in the component descriptor, the output of the data science operation is stored in two variables: "items" of type string array, and "counts" of type integer array. These declarations allow the data science system to capture the output results of the data science operation and store them for later visualizations and subscriptions.

As described above, in one or more embodiments, the additional action information 230, including the action description 232 for an action, is associated with the component descriptor based on the action's reusable algorithm building block. More specifically, in some embodiments, the data science system populates portions of the component descriptor using the additional action information 230. For example, information with respect to the action's name, version, type, language, and description are each included in the component descriptor.

Returning to FIG. 2C, if a user is satisfied with the selected action (e.g., the FDT 228 action), the user can confirm their selection by selecting an action confirmation option 240 (e.g., the "use button") within the additional action information 230. Upon the user confirming his or her selection, the data science system uses the reusable algorithmic building blocks (including the descriptor) corresponding to the selected option to create a data science algorithm that performs a data science operation.

To illustrate, FIG. 2D shows the data science system creating a data science algorithm to perform a data science operation as displayed in the test and deploy section 216. In general, the test and deploy section 216 allows a user to preview results when injecting the selected data with the selected action. Additionally, the test and deploy section 216 as enables a user to perform modifications on the data science operation. More specifically, the test and deploy section 216 includes an input area 242, a data science algorithm area 244, and an output area 246. The input area 242 displays which data is being injected into the data science algorithm. For example, input area 242 shows the one hour of data selected from Clicks 212 as the input.

The algorithm area 244 provides code that forms the data science operation. As described above, the data science system uses reusable algorithmic building blocks from the selected action to create a data science operation that includes one or more algorithm. As such, the algorithm area 244 displays the code created by the data science system to perform the corresponding algorithm(s).

In some embodiments, the data science system enables a user to edit portions of the data science operation. For example, the data science system provides an additional graphical user interface that interacts with the users by indicating which parameters in the data science algorithm are tunable. For instance, for the given algorithm in FIG. 2D, the data science system provides a graphical user interface to the user indicating that the number of results is a tunable parameter. As such the user can change the number of results from the default value of 10 to another value. In some cases, a tunable parameter does not have a default value and the user must provide a value for the parameter before the data science operation is functional.

In one or more embodiments, the user can directly edit portions of the code. For example, the data science system enables the user to change the value of tunable parameters directly in the code of the data science algorithm. For instance, a user changes the number of results displayed in the code itself. When allowing the user to directly modify the code, the data science system can highlight which portions of code are editable. Further, the data science system can protect other portions of the data science algorithm such that the user does not incorrectly modify the code that and cause the data science operation not to properly function.

Regardless of how the user edits the code, if after customizing the code of the data science operation, the user can save the modified code as a new action (e.g., using the "Save Code as Action" button shown). In various embodiments, when saving the data science operation as new action, the data science system provides another graphical user interface to the user for the user to input information about the new action. For example, the data science system may prompt the user to provide a brief description, a version and whether the new action is sharable or private. When the new action is saved, the data science system can display the new action in the actions section 214 within the graphical user interface 200.

In some embodiments, the input from the selected data source and the selected action are not compatible. For example, the actions require data types that are not included in the selected data source. In these circumstances, the data science system provides a notification to the user informing the user that another type of data source is required. For instance, the data science system can display the notification in the output area 246. Alternatively, the data science operation can provide an additional graphical user interface that provides the notification.

As mentioned above, the user can run the data science operation to obtain output results. For example, the user selects the "run" option 248 to execute the code found in the algorithm area 244 and the data science system displays the output results of the operation in the output area 246. For instance, as shown, the output area 246 indicates the state of the operation, the elapsed time, and the completion of the operation. Further, when the data science system completes a data science operation and the operation includes a visual result, the user can select the visual result option 250 (e.g., the "Graph View" button) to view the results as a graph or other visual result.

To illustrate, FIG. 2E displays a results graphical user interface 252 of a bar graph 254 showing the output results of the data science operation. The results graphical user interface 252 includes selectable options to change how the results are presented (e.g., buttons to change the style of the bar graph from a bar graph to a line graph, scatter plot, or other type of graph). In this manner, the data science system provides and/or recommends various visualization outputs to help users better understand the output results.

As mentioned above, the data science system uses visualization code to generate a visual result. Listing 2, provided below, illustrates a sample of visualization code that the data science system 102 includes in a data science package to display a bar graph. One will appreciate that the data science system 102 can employ other visualization codes. Further, one will appreciate that in some embodiments the data science system 102 has visualization codes embedded within the data science system 102, and thus including visualization code in a data science package is not necessary.

Listing 2

```
"visualization code" :{
    "name": "Labeled vertical bar graph",
    "version": "1.1.1",
    "type": "graph",
    "style": "bar",
    "lang": "d3",
```

-continued

Listing 2

```
    "descriptorVersion": "2.0.1",
    "description": "A reference implementation of a labeled vertical
bar graph, implemented in D3 and JavaScript. The numbers of bars in
the graph is determined by the size of the dimensionArray.",
    parameters": {
        "labelArray": {
            "type": "string[ ]",
            "label": "X-Axis label Array"
        },
        "dimensionArray": {
            "type": "integer[ ]",
            "label": "Y-Axis dimension Array"
        }
    },
    "input": {
        "type" : "json",
        "required" : {
            "+" : "string[ ]",
            "+" : "integer[ ]"
        }
    },
    "output": {
        "type" : "graph",
        "style" : "bar"
    }
}
```

Listing 2, like Listing 1, includes description information, a parameters section, an input section, and an output section. The parameters section, the input section, and the output section specify the data types used in the visualization code and how the data types are incorporated into a data science operation. Using the visualization code, the data science system 102 provides a visual output to the user. With respect to Listing 2, the visualization code enables the data science system 102 to generate and display a bar graph.

The user can choose to have the data science system save the data science session. For example, returning to FIG. 2D, the user can select the save option 256 to save the data science session (i.e., state of the user interface) so it can be restored at a future point in time.

If the user is satisfied with the results, the user can return to the test and deploy section 216 and deploy the data science operation as a service. For example, the user selects the "deploy as service 258" option in the toolbar 204, which saves the data science operation as a package. Once the data science system has saved the data science operation as a data science package, the user can later load and run the data science operation within the data science package. Thus, the user can routinely run the data science operation according to parameters specified by the user. For instance, the user specifies to run the data science operation once-per-day using the last 24-hours of collected data from the Clicks 218 data source and the FDT 228 action and to send a copy of the report to the user's email.

In one or more embodiments, packaging a data science operation into a data science package includes wrapping the data science package with the component descriptor. Wrapping the data science package with the component descriptor provides a number of benefits. For example, as mentioned above, when a data science package is wrapped with the component descriptor, the data science system quickly loads the data science package to a registry and rapidly executes the customized data science operation. The decrease in processing time occurs because the component descriptor serves as a lightweight container that provides metadata (e.g., information and structure) regarding the data science operation, and in particular, the data science algorithm.

Saving a data science operation as a data science package also enables the user to share the data science package with other users. For example, the user provides his or her data science package to a service catalog and/or marketplace. Further, the user can download and/or purchase data science package provided by other users. In this manner, the data science system can inject the user's data with the service downloaded by the user.

To illustrate, the user can select "Services 260" from the header 202, as shown in FIG. 2D, to view a service catalog and/or marketplace that includes a list of data science packages (often called services when in the marketplace environment). Upon selecting the Services 260, the graphical user interface 200 updates the body 206 to display the service catalog and/or marketplace as shown in FIG. 2F. In particular, FIG. 2F shows services 262 available to the user. Each service 262 can include a title 264 and brief description 266 of the service. Often, the title 264 and the brief description 264 is obtained from the descriptor and/or description 230 associated with the service described above.

In one or more embodiments, a user selects a service 262 from the service catalog and/or marketplace. The data science system adds the selected service to the actions section 214 of the graphical user interface 200. Then, using the newly obtained service (i.e., data science package), the data science system enables a user to pair the data science package with a data source from the user's data sources. In this manner, and as described above, the data science system creates a customized data science operation. Further, as previously described, the data science system can enable the user to modify the data science operation (e.g., customize one or more tunable parameters) to better meet the user's needs.

Figure 3:
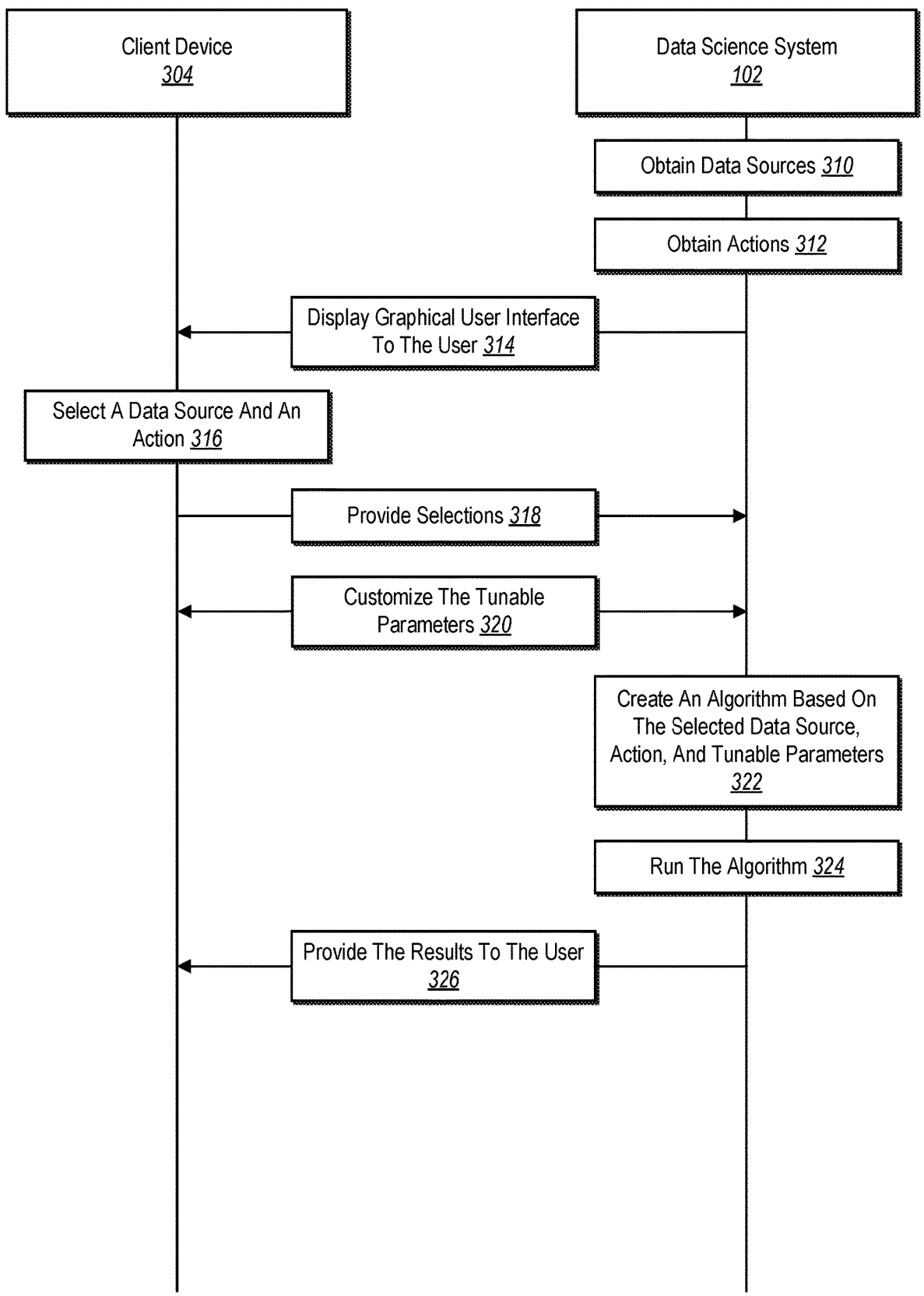
FIG. 3 illustrates an example sequence diagram of enabling a user to create and perform a data science operation in accordance with one or more embodiments.

FIG. 3 illustrates an example sequence diagram of the data science system 102 enabling a user to create and perform a data science operation. A shown, FIG. 3 includes a client device 304 communicating with the data science system 102. The client device 304 can be an example embodiment of the client device 104 described with respect to FIG. 1. In this manner, the client device 304 can enable a user to communicate with the data science system 102.

As shown in FIG. 3, the data science system 102 obtains one or more data sources, as step 310 illustrates. As mentioned above, the data science system 102 can receive a data source from a third-party service. Alternatively, the data science system 102 can directly collect data for a data source. As part of obtaining a data source, the data science system 102 identifies a data source schema for the data source. The data source schema indicates the data that is included in the data source and how the data is structured. As such, the data source schema allows the data science system 102 to read and use a data source in various operations.

In step 312, the data science system 102 obtains actions. The actions can be created and provided to the data science system 102 by a data scientist. Additionally, and/or alternatively, a user can create an action. For example, a user can modify and save an existing action. Further, other users of the data science system 102 can provide actions to the data science system 102. In some embodiments, another party (e.g., a co-user, entity, or data scientist) can make an action available to a user via a marketplace as a service or data science package. In these embodiments, the user can browse, download, gain access to, and/or purchase different services or data science packages actions from the marketplace, as described above. Further, the data science system 102 can recommend various data science packages in the marketplace for a user to use.

Upon obtaining data sources and actions, the data science system 102 employs a framework that facilitates and provides a graphical user interface to the client device 304, as shown in step 314. The graphical user interface displays the obtained data sources and actions. For example, the data science system 102 can facilitates a graphical user interface like the graphical user interface 200 described with respect to FIGS. 2A-2F.

In step 316, the user, via the client device 304 selects a data source and an action. In particular, the client device 304 receives a selection of data from a data sources and at least one action. Upon the user making a selection, the client device 304 sends the user selections to the data science system 102, as shown in step 318.

Upon receiving the selections, the data science system 102 identifies tunable parameters within the selected action. For example, the selected action has one or more parameter that the user can customize and/or modify. In some instances, the tunable parameter has a default value, which the data science system 102 uses unless changed by a user. In other instances, the action requires a user to provide a parameter before executing the data science operation.

As shown in step 320, the user customizes the tunable parameters. In particular, the data science system 102 prompts the user via the client device 304 regarding the tunable parameters. For instance, the data science system 102 provides an additional graphical user interface or modifies the current graphical user interface to notify the user of the tunable parameters and allow the user to apply customizations. In response, the user applies customizations to the tunable parameters.

In step 322, the data science system 102 uses the framework to create a data science operation based on the selected data source, the selected action, and the tunable parameters. In particular, the data science system 102 uses the workflow provided by the framework to create a data science algorithm and inject data from the data source into the data science algorithm. As described above, in some embodiments, the data science system 102 uses the annotations from the reusable algorithm building blocks to create the data science operation. Additionally, the data science system 102 modifies the data science operation based on the customizable parameters. Upon creating the data science operation, the data science system 102 runs the data science operation, as step 324 illustrates. As mentioned previously, the data science system 102 enables the user to test and modify the data science operation (e.g., change the tunable parameters) as desired even after the data science operation is initially created.

Step 326 illustrates the data science system 102 providing results to the user via the client device 304 upon running the data science operation. The results may be text or visual results. As described above, examples of visual results include graphs, plots, and charts. For example, the data science system 102 provides a number of recommended visual results to the user. Alternatively, the results may be non-visual, such as text-based or stored in various data frames/data structures. In some cases, the data science system 102 uses the non-visual results as a data source input for a subsequent action.

In some embodiments, the user can optionally create a deployable service and/or package the data science operation that adheres to the framework described herein. As mentioned above, deploying the data science operation as a service allows a user to run the data science operation on a routine basis. Packaging the data science operation allows a user to provide the data science operation to other users, for example, via a service catalog or marketplace. As described previously, when the data science system 102 packages a data science operation, the data science system 102 associates the data science package with a component descriptor (and description) that enables the data science system 102 to determine which data sources include data that is compatible with the data science package. The component descriptor also enables the data science system 102 and other systems to use the framework and identify the functionality of the data science operation within the data science package within needed to unpack the data science package.

In some embodiments, once the user selects the data, the data science system uses the component descriptor to bind the selected data to the data science algorithm to generate a customized data science operation. Specifically, the data science system 102 uses the component descriptor to bind the selected data to the required inputs of the data science algorithm. For example, the component descriptor comprises binding information that indicates which data types in the selected data to bind to which variables within the data science algorithm. In this manner, the data science system 102 injects the user's data into the data science algorithm from the data science package. Further, depending on the number of tunable and/or optional parameters, the user can further modify and customized the data science operation.

In addition to generating a component descriptor for a data science package, in some embodiments, the data science system 102 also generates a service descriptor for the data science package. For example, the data science system 102 generates a service descriptor for data science packages that include multiple data science algorithms within a data science operation. For instance, when a data science package includes multiple data science algorithms, the data science package often includes multiple component descriptors, which can create conflicts. As such, a service descriptor serves as an additional container that packages the multiple component descriptors together within a data science package.

Figure 4:
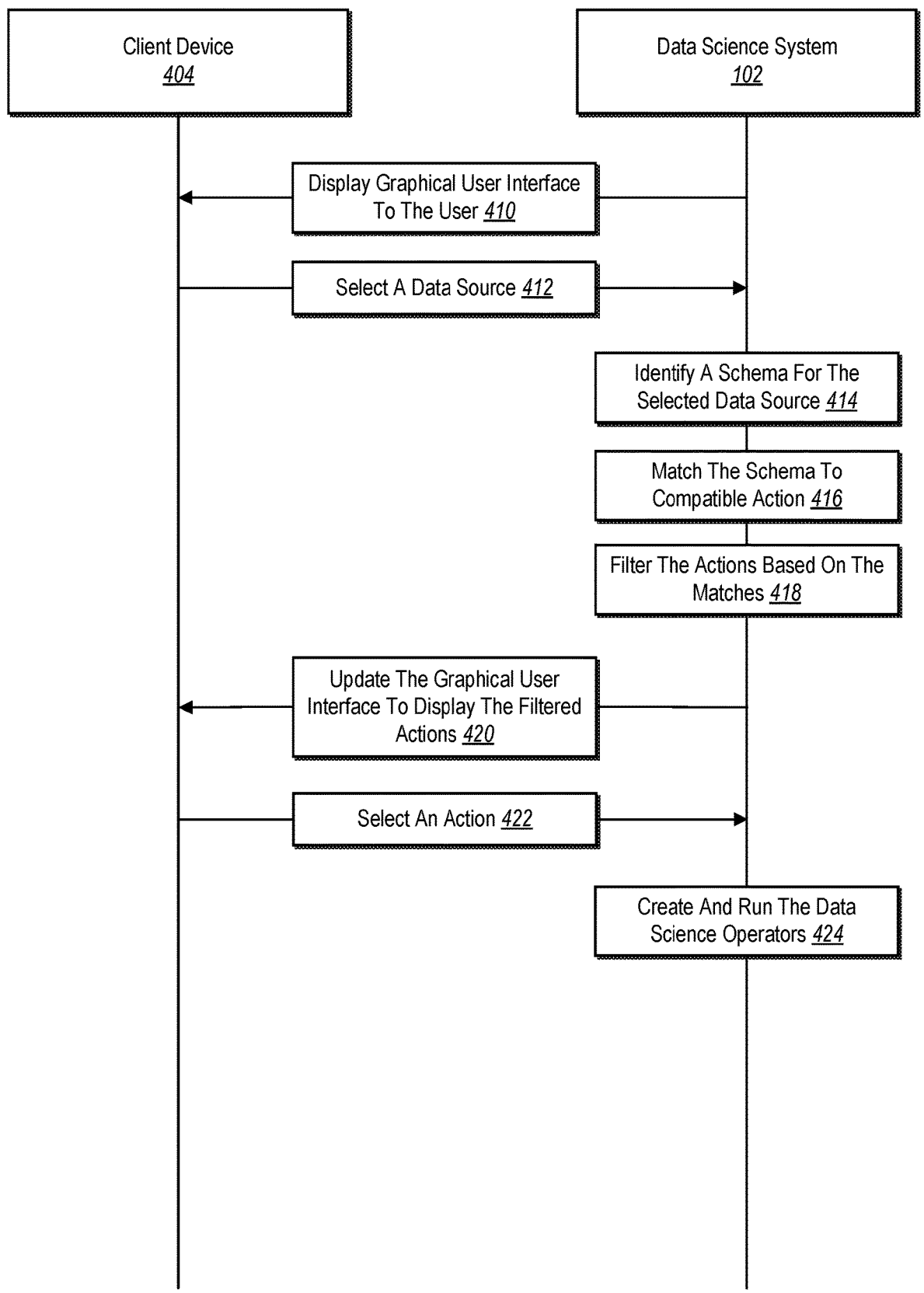
FIG. 4 illustrates an example sequence diagram of providing an intelligent graphical user interface that dynamically updates based on a user selection in accordance with one or more embodiments.

FIG. 4 illustrates an example sequence diagram of the data science system 102 providing an intelligent graphical user interface that dynamically updates based on a user selection. As shown, FIG. 4 includes a client device 404 communicating with the data science system 102. The client device 404 can be an example embodiment of the client device 104 described with respect to FIG. 1. In this manner, the client device 404 can enable a user to communicate with the data science system 102.

In addition to the graphical user interface provided above, the data science system 102 can dynamically adjust the graphical user interface in accordance with the framework of the data science system to simplify the process of creating a data science operation. In this manner, the data science system 102 further intelligently interacts with and guides users through the process of creating data science operations by matching data sources with compatible actions. Further, as the data science system 102 dynamically interacts with a user, the data science system 102 improves the functionality of the client device itself by reducing the backend processing and display resources needed to provide filtered data (e.g., data sources and/or actions) to the user.

To illustrate, step 410 in FIG. 4 shows the data science system 102 displaying the graphical user interface to a user via the client device 404. The graphical user interface displays the data sources and actions. For example, the data science system 102 can display a graphical user interface like the graphical user interface 200 described with respect to FIGS. 2A-2E. For instance, the graphical user interface includes a data source section, an actions section, and a test and deploy section.

In step 412, the user selects a data source via the client device 404. In particular, the user selects a data source within the data source section as described above. For example, the data source section includes a listing of available data sources collected by the user that cover a variety of collected data (e.g., web traffic data, keywords searches, survey responses, customer feedback, social networking data, user behavior modeling, sales data, and clicks and impressions) and include a range of data types.

Upon selecting a data source, the data science system 102 identifies a schema (i.e., a data source schema) for the selected data source, as step 414 illustrates. For example, the data science system 102 identifies a schema associated with the selected data source. In some embodiments, the data science system 102 generates a data source schema from the data source by identifying data types within and the structure of the data schema. In particular, the data science system 102 identifies the types of data within the selected data source from the corresponding schema.

Using the schema of the data source, the data science system 102 matches the selected data source to compatible actions, as shown in step 416. Specifically, the data science system 102 can use annotations and/or component descriptors associated with each action to identify required and optional data types used by the action (see Listing 1 above for an example of a component descriptor that includes annotations). The data science system 102 then verifies that the identified data types in the action match the data types in the selected data source. If an action uses data types provided in the selected data source, the data science system 102 denotes the action as a compatible action.

As an example, the user selects a data source that includes a schema indicating that the data source contains a dataFrame (i.e., a distributed collection of data, which is organized into named columns) pertaining to social networking data. Included in the dataFrame is an array of strings and an array of integers relating to social preferences of users. The data science system then scans each action to identify which actions have fields requiring a string array data type and an integer array data type. For each action having these required data types, the data science system 102 denotes the action as compatible.

In one or more embodiments, the data science system 102 scans each action by identifying annotations in each action and identifies required data types from the annotations. In some embodiments, an action requires a more restrictive input, such as a field with a particular name and type. In these embodiments, the data science system 102 only denotes an action as compatible with an action if the selected data source matches the more restrictive required input of the action.

In step 418, the data science system 102 filters the actions based on the matches of compatible actions. For example, the data science system 102 filters the actions section to only display actions that are compatible with the selected data source. Further, as step 420 illustrates, the data science system 102 updates the graphical user interface to display the filtered actions. In this manner, upon the user selecting a data source and uses the interactive user interface, the data science system 102 ensures that any action subsequently selected by the user will include compatible data with the selected data source.

As shown in step 422, the user selects an action on the client device 404. For example, the user selects an action from the filtered list of actions in the actions section. After the user selects an action, the data science system 102 creates and generates and runs a data science operation using the selected data source and action, as shown in step 424 and as described above.

In some embodiments, rather than filtering out non-compatible actions, the data science system 102 can highlight, move up, and/or otherwise recommend compatible actions to a user. Further, depending on the number of matching data types, some actions may be more compatible with the data source than other actions. As such, the data science system 102 can rank the actions based on how compatible an action is relative to the other actions. For example, the data science system 102 ranks the actions based on a compatibility score and displays the actions based on the ranking.

In addition, just as the data science system 102 can filter actions based on a selected data source, the data science system 102 can likewise filter data sources based on a selected action. For example, the data science system 102 displays an unfiltered list of data sources and actions to the user. The user then selects an action. In response, the data science system 102 identifies descriptors in the selected action. The data science system 102 then inspects the data sources in the data source section to find data sources that include the same data types identified in the selected action, which the data science system 102 classifies as a compatible data sources. The data science system 102 then updates the graphical user interface display of the data source section to display only data sources compatible with the selected action. If the user selects another action, the data science system 102 re-determines compatible data sources and updates the graphical user interface display accordingly.

Figure 5B:
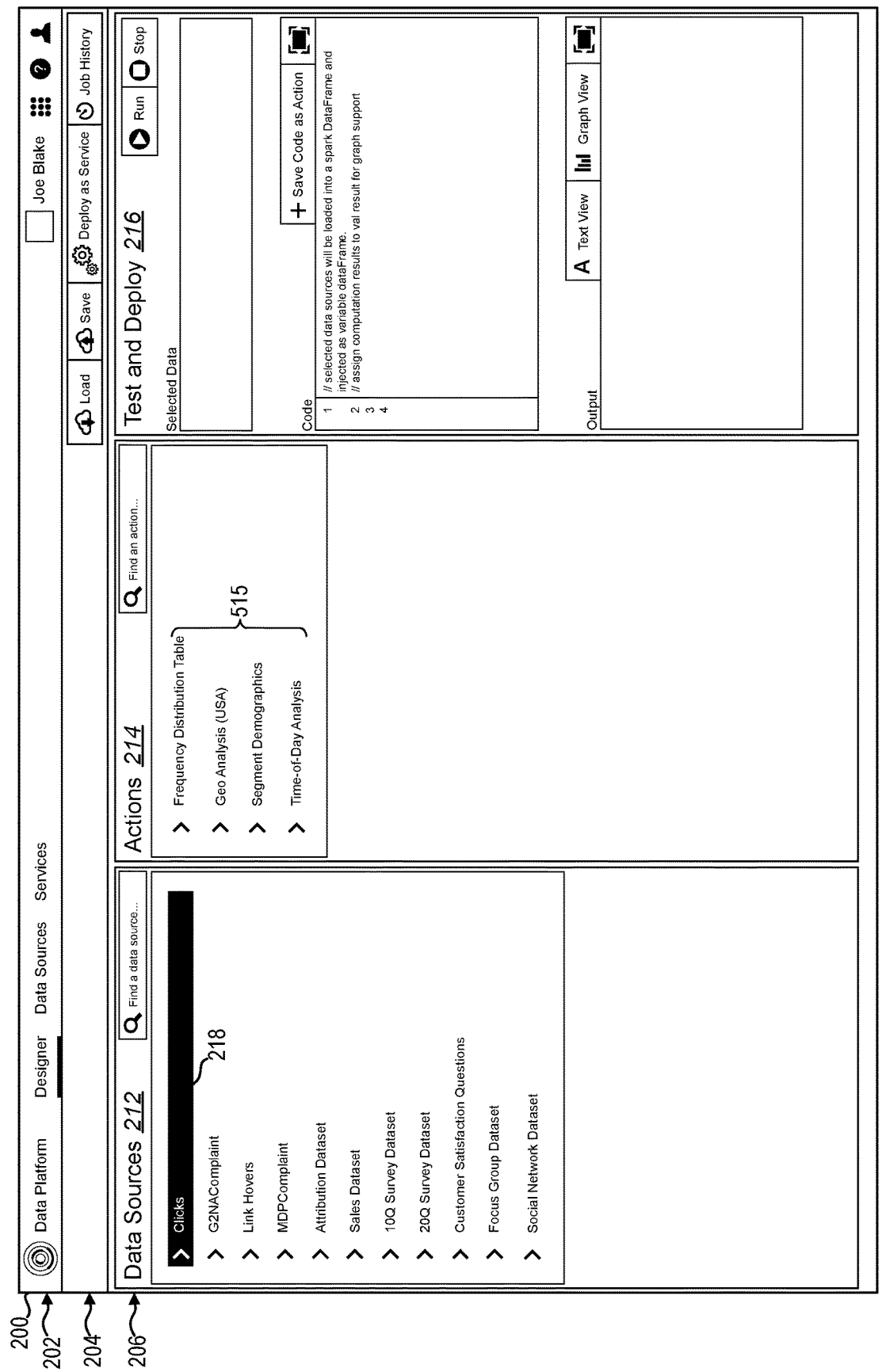

To further illustrate, FIGS. 5A-5B show the data science system dynamically updating an interactive graphical interface based on a user selection. In general, the data science system and the user referred to in FIGS. 5A-5B can be example embodiments of the data science system 102 and the user 108 described with respect to FIG. 1. Further, one of the client devices 104, 304, 404 described above, or another computing device, can display the graphical user interfaces shown in FIGS. 5A-5B.

FIG. 5A illustrates the graphical user interface 200 described above with respect to FIG. 2A. For example, the graphical user interface 200 includes the header 202, the toolbar 204, and the body 206. Further, as described above, the body 206 of the graphical user interface 200 includes a data source section 212, an actions section 214, and a test and deploy section 216. In particular, the data source section 212 displays a list of data sources and the actions section 214 displays a list of actions. While some of the data sources are compatible with some of the actions, rarely are all data sources compatible with each listed action.

In FIG. 5A, a user desiring to build a data science operation selects a data source from the data source section 212. For example, the user selects the Clicks 218 data source from the data sources. Upon the user selecting the Clicks 218 data source, the data science system determines compatible actions as described above, and updates the graphical user interface 200 to display compatible actions. More specifically, the data science system updates the actions section 214 of the graphical user interface 200 to filter out incompatible actions.

To illustrate, in FIG. 5B, the user selects the Clicks 218 data source. In response, the data science system 102 determines which actions are compatible and automatically filters the list of actions to display the compatible actions 515. In this manner, using any of the displayed compatible actions 515, the data science system 102 can create and run a data source using data from the Clicks 218 data source. Thus, the data science system 102 enables the user to easily understand which actions work with a particular data source, which reduces the complexity and confusion typically associated with creating data science operations.

Once the user selects a compatible action, the user can test, modify, and deploy the data science operation as described above. If, however, the user selects a different data source, the data science system can again update the graphical user interface 200 to show actions in the actions section 214 that are compatible with the newly selected data source. In some instances, if the newly selected data source includes similar data types as the previously selected data source, the compatible actions 515 may remain the same.

Further, as mentioned above, in some embodiments, the data science system 102 can filter compatible data sources in the data source section 212 based on a selected action. For example, if the user selected the action "Geo Analysis (USA)" shown in FIG. 5A, the data science system 102 narrows down the data sources in the data source section 212 to show a subset of the data sources that are compatible with the selected action. The user can then select one or more of the compatible data sources to pair with the selected action for the data science system to include in a data science operation.

In various embodiments, if the user views the service catalog and/or marketplace (as described above in connection with FIG. 2F), the data science system can filter which services are presented to the user's data sources. In other words, the data science system only displays services (e.g., data science packages) in the service catalog that are compatible with the user's data sources. Additionally, the data science system can filter services in the service catalog and/or marketplace based on a selected data source.

In some embodiments, if the user selects a data source for which there are no compatible actions in the actions section 214, the data science system identifies compatible services from the service catalog and/or marketplace and provides the compatible services to the user. Alternatively, even when the data science system determines that one or more actions in the actions section 214 are compatible with the data source selected by the user, the data science system can recommend one or more services from the service catalog that are also compatible with the selected data source.

Figure 6:
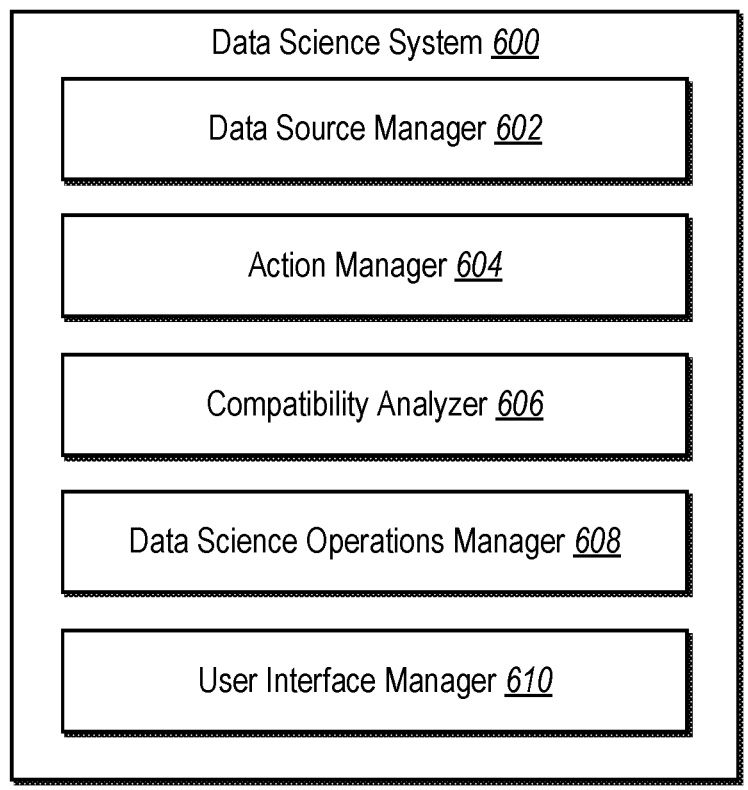
FIG. 6 illustrates an example schematic diagram of the data science system in accordance with one or more embodiments.

FIG. 6 illustrates an example schematic architecture diagram of a data science system 600. The data science system 600 can be an example embodiment of the data science system 102 described above. One or more computing devices (e.g., server devices) can implement the data science system 600. Additional details with respect to computing devices are discussed with respect to FIG. 9 below.

As shown in FIG. 6, the data science system 600 can include various components for performing the processes and features described herein. For example, in the embodiment shown in FIG. 6, the data science system 600 includes a data source manager 602, an action manager 604, a compatibility manager 606, a data science operations manager 608, and a user interface manager 610.

The components 602-610 of the data science system 600 can comprise software, hardware, or both. For example, the components 602-610 can comprise one or more instructions stored on a computer-readable storage medium and executable by processors of one or more computing devices, such as a client device or server device. When executed by the one or more processors, the computer-executable instructions of the data science system 600 can cause the computing device(s) to perform the feature learning methods described herein. Alternatively, the components 602-610 can comprise hardware, such as a special purpose processing device to perform a certain function or group of functions. Alternatively, the components 602-610 of the data science system 600 can comprise a combination of computer-executable instructions and hardware.

As mentioned above, the data science system 600 includes the data source manager 602. In general, the data source manager 602 manages a user's data sources. As described above, the data source manager 602 receives data sources from third-party services or facilitates a user in collecting data for a data source via the data science system 600. When additional data is received for the data source, the data source manager 602 updates the corresponding data source.

In addition, the data source manager 602 identifies a data source schema for each data source. If the data source manager 602 cannot identify a schema, the data source manager 602 creates a data source schema as described previously. Alternatively, the data source manager 602 may prompt a user to create a data source schema when the data source manager 602 cannot identify a data source schema for a data source.

The action manager 604 manages a user's actions. For example, the action manager 604 assists a user with acquiring actions. For instance, the action manager 604 facilitates a user downloading and/or purchasing actions from a repository (e.g., a service catalog or marketplace). Further, the action manager 604 assist users in creating and storing new actions.

The action manager 604 also identifies descriptors (and/or descriptions) for an action. For example, when an action is created, the action manager 604 prompts the user to provide a description of the action. As another example, when an action is coded, the creator of the action can annotate the component descriptor to include information corresponding to the action.

The action manager 604 also identifies the reusable algorithm building blocks corresponding to an action, which can include the descriptor. As part of the descriptor, the action manager 604 determines which parameters are required and which parameters are optional. Further, the action manager 604 can identify when a parameter (required or optional) is tunable or customizable, as described above.

The compatibility manager 606, in general, determines whether a data source and an action are compatible. More specifically, the compatibility manager 606 compares and/or matches the data source schema for a data source to a descriptor of an action (e.g., the input schema listed in the descriptor). Based on the comparison, the compatibility manager 606 determines whether the data source and the action are compatible.

In some embodiments, the compatibility manager 606 determines that a data source and an action are compatible when the data source includes data types used by the action. In other words, if the action requires one or more parameters of a particular data type (or types), the compatibility manager 606 can determine compatibility when a data source includes the particular data type (or types). Further, the compatibility manager 606 can determine compatibility between many data sources to many actions, as described above.

The data science operations manager 608 (or simply "operations manager 608") creates and executes data science operations. For example, when a user selects a data source and an action, the data source generates a data science algorithm as part of the data science operation from reusable algorithm building blocks associated with the action and injects data from the selected data source into the data science algorithm. In some embodiments, the operations manager 608 prompts the user to provide required or optional input regarding one or more tunable parameters.

The operations manager 608 also executes the data science operation to achieve output results with respect to the selected data source and action. If the user does not achieve the desired result, or desires another results, the operations manager 608 allows the user to modify one or more parts of the data science operation. For example, the operations manager 608 provides tools to the user to change tunable parameters within the data science operation and re-run the data science operation.

The operations manager 608 may output various types of results. In one or more embodiments, the operations manager 608 outputs a visual result, such as a graph or chart. In alternative embodiments, the operations manager 608 outputs data that serves as input for another action. For example, the operations manager 608 performs multiple algorithms in serial using the output data from the first action as input data in the second action before outputting a visual result.

As described above, the operations manager 608 can deploy a data science operation as a service. Additionally, the operations manager 608 can also save and load data science operations. For example, as provided above, the operations manager 608 packages the data science operation as a data science package and add the data science package to a service catalog and/or marketplace. Similarly, the operations manager 608 allows a user to download and run a data science package from a marketplace by apply the user's data to the data science package and generating a data science operation customized to the user.

The user interface manager 610, in general, displays a graphical user interface to a user. In many embodiments, the graphical user interface is an intelligent interface that dynamically updates as a user interacts with the data science system 600. For example, as a user provides selections of data sources and/or actions, the user interface manager 610 updates other parts of the graphical user interface by filtering unnecessary/incompatible data from the graphical user interface. In addition, the user interface manager 610 provides prompts (e.g., in an additional graphical user interface) that help guide a user through the process of creating and modifying a data science operation. Further, the user interface manager 610 displays visual results outputted by the data science operations manager 608.

FIGS. 1-6, the corresponding text, and the examples, provide a number of different systems and devices for performing data science operations in accordance with one or more embodiments. In addition to the foregoing, one or more embodiments can also be described in terms of flowcharts comprising acts and steps in a method for accomplishing a particular result. For example, FIGS. 7 and 8 illustrate flowcharts of exemplary methods in accordance with one or more embodiments.

Figure 7:
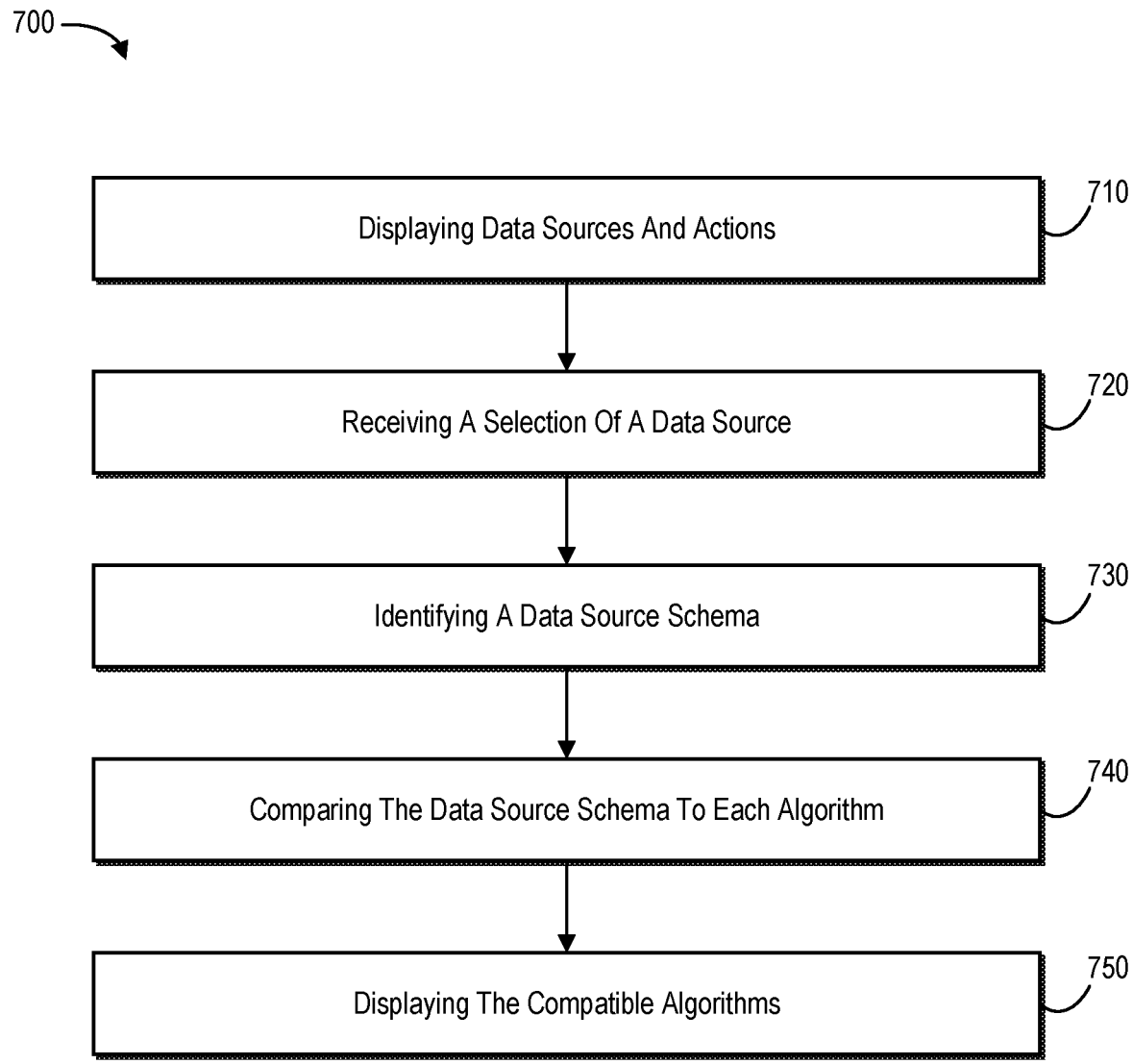
FIG. 7 illustrates an example flow diagram of generating a data science operation in accordance with one or more embodiments.
Figure 8:
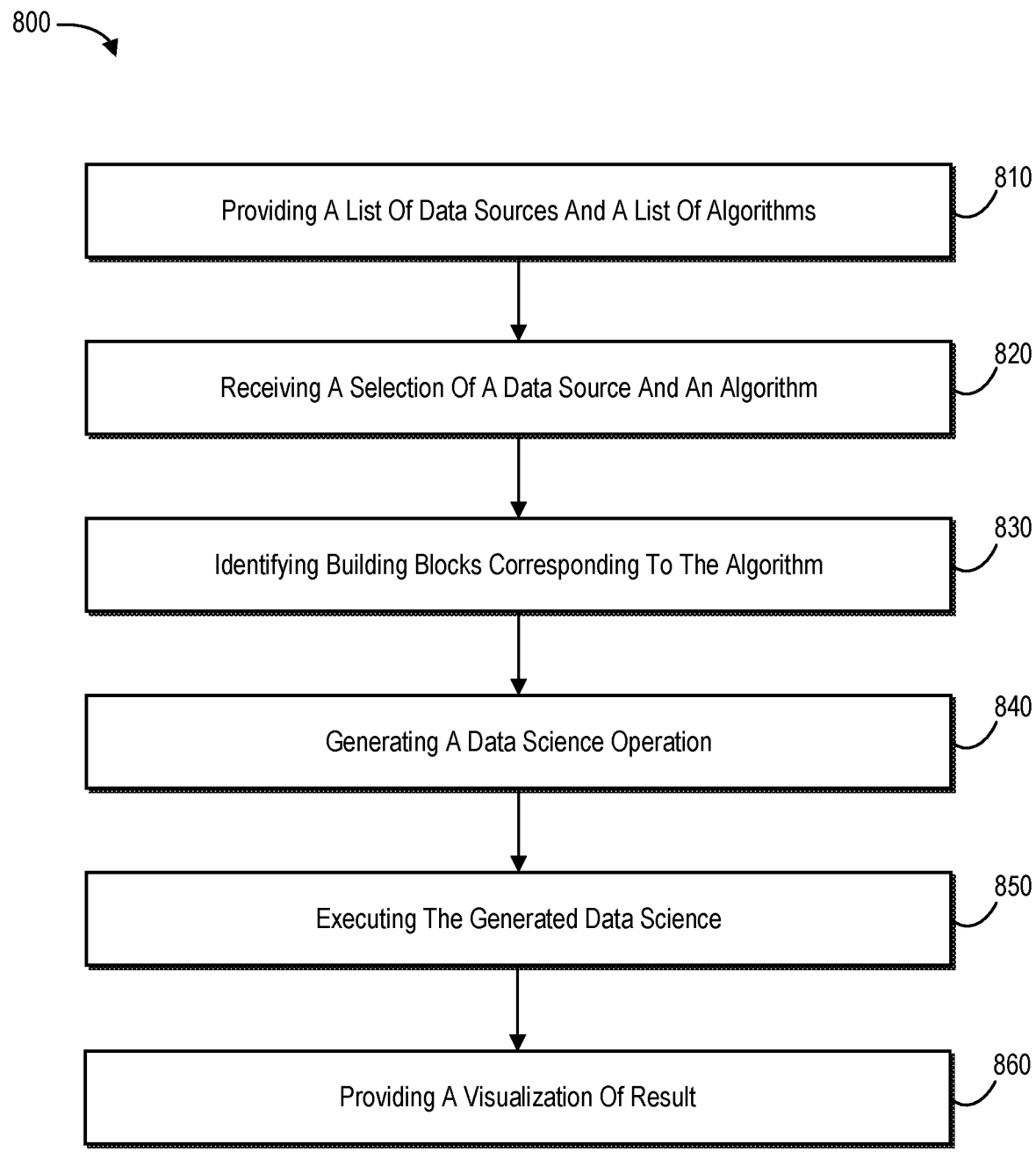
FIG. 8 illustrates an example flow diagram of providing a dynamic graphical user interface for data science operations in accordance with one or more embodiments.

FIG. 7 illustrates a flowchart of a series of acts in a method 700 for providing a dynamic graphical user interface for data science operations in accordance with one or more embodiments disclosed herein. In one or more embodiments, the method 700 is implemented in a digital medium environment for performing data science operations. Further, one or more computing devices described herein can implement a data science system that implements the method 700.

The method 700 includes an act 710 of providing a list of data sources and a list of algorithms. In particular, the act 710 may involve displaying, within a graphical user interface, a plurality of data sources and a plurality of algorithms. For example, the act 710 of displaying data sources and algorithms may involve displaying a list of data sources and displaying a list of algorithms as described herein.

The method 700 further includes an act 720 of receiving a selection of a data source. In particular, the act 720 can involve receiving, from a user interacting with the graphical user interface, a selection of a data source from the plurality of data sources. In some embodiments, the act 720 involves the user selecting a data source from the list of data sources within the graphical user interface in any suitable manner described herein.

The method 700 also includes an act 730 of identifying a data source schema. In particular, the act 730 may include identifying a data source schema for the selected data source. In various embodiments, the data source schema includes at least one data type of data stored in the selected data source.

In addition, the method 700 includes an act 740 of comparing the data source schema to each algorithm. In particular, the act 740 may involve comparing the data source schema to each algorithm of the plurality of algorithms to identify compatible algorithms. In one or more embodiments, each algorithm of the plurality of algorithms includes a descriptor, and each descriptor identifies at least one data type used by the algorithm. In additional embodiments, the act 740 includes comparing the data type from the data source schema of the selected data source to descriptors from the plurality of algorithms to identify algorithms having the data type.

The method 700 further includes an act 750 of displaying the compatible algorithms. In particular, the act 750 may involve updating the graphical user interface to display only compatible algorithms. In some additional embodiments, the method 700 may also include acts of receiving, within the graphical user interface, a selection of a compatible algorithm from the compatible algorithms, generating a data science operation using the selected data source and the selected algorithm, and executing the data science operation. Further, in some embodiments, executing the data science operation outputs a result, where the result is a visual result such as a graph, chart, or plot.

FIG. 8 illustrates a flowchart of a series of acts in a method 800 for creating a data science operation in accordance with one or more embodiments disclosed herein. In one or more embodiments, the method 800 is implemented in a digital medium environment for performing data science operations. Further, one or more computing devices described herein can implement a data science system that implements the method 800.

The method 800 includes an act 810 of providing a list of data sources and a list of algorithms. In particular, the act 810 may involve providing, via a user interface, a list of data sources and providing, via the user interface, a list of data science algorithms. For example, the act 810 displays the list of data sources and data science algorithms in any suitable manner as described herein. In various embodiments, the act 810 also includes displaying a description of each algorithm of the plurality of algorithms, where the description provides data types associated with each algorithm. In one or more embodiments, one or more data sources from the list of data sources are user-specific data sources.

The method 800 further includes an act 820 of receiving a selection of a data source and an algorithm. In particular, the act 820 can involve receiving, based on user input, a selection of a data source from the list of data sources and a data science algorithm from the list of data science algorithms. In some embodiments, the act 820 involves the user selecting a data source and/or algorithm from the list of data sources within the graphical user interface in any suitable manner described herein.

The method 800 also includes an act 830 of identifying building blocks corresponding to the algorithm. In particular, the act 830 can involve identifying reusable algorithm building blocks corresponding to the data science algorithm. For example, the act 830 includes looking up reusable algorithm building blocks that are associated with the selected algorithm.

Additionally, the method 800 includes an act 840 of generating a data science operation. In particular, the act 840 can involve generating a data science operation by injecting data from the data source into the identified reusable algorithm building blocks. In some embodiments, the act 840 can include using the reusable algorithm building blocks to generate computer language code that, when executed, performs data science operations on the selected data source. In one or more embodiments, the act 840 can involve identifying one or more tunable parameters associated with the reusable algorithm building blocks of the selected algorithm, for example, using annotations associated with the selected algorithm.

The method 800 also includes an act 850 of executing the generated data science. In particular, the act 850 can involve executing the generated data science operation to generate a data science result. For example, the act 850 executes the data science operation in any suitable manner as described herein.

In addition, the method 800 includes an act 860 of providing a visualization of result. In particular, the act 860 can involve providing, via the user interface, a visualization of the data science result. For example, the act 860 includes displaying the output results of the data science operation as a graph, chart, or plot within the graphical user interface.

The method 800 can also include a number of acts. For example, the method 800 can include the acts of identifying one or more tunable parameters, prompting the user to modify the tunable parameter from a default value to a user-defined value, and executing the data science operation using the user-defined value for the tunable parameter. Further, the method 800 may include the acts of receiving updated input from the user modifying the tunable parameter to a second user-defined value, executing the data science operation using the second user-defined value for the tunable parameter, and packaging the data science operation as a data science package. Additionally, the method 800 may include an act of deploying the data science packaged as a service to a service catalog and/or marketplace.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase change memory, other types of memory, other optical disk storage, magnetic disk storage or other magnetic storage devices, or any other medium which can be used to store desired program code means in the form of computer-executable instructions or data structures and which can be accessed by a general purpose or special purpose computer.

The term "digital environment," as used herein, generally refers to an environment that is implemented, for example, as a stand-alone application (e.g., a personal computer or mobile application running on a computing device), as a module of an application, as a plug-in for an application, as a library function or functions that may be called by a network application creation system, and/or as a cloud-computing system. A digital medium environment allows users to create, test, and/or edit data science operations in connection with a data science system.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 9:
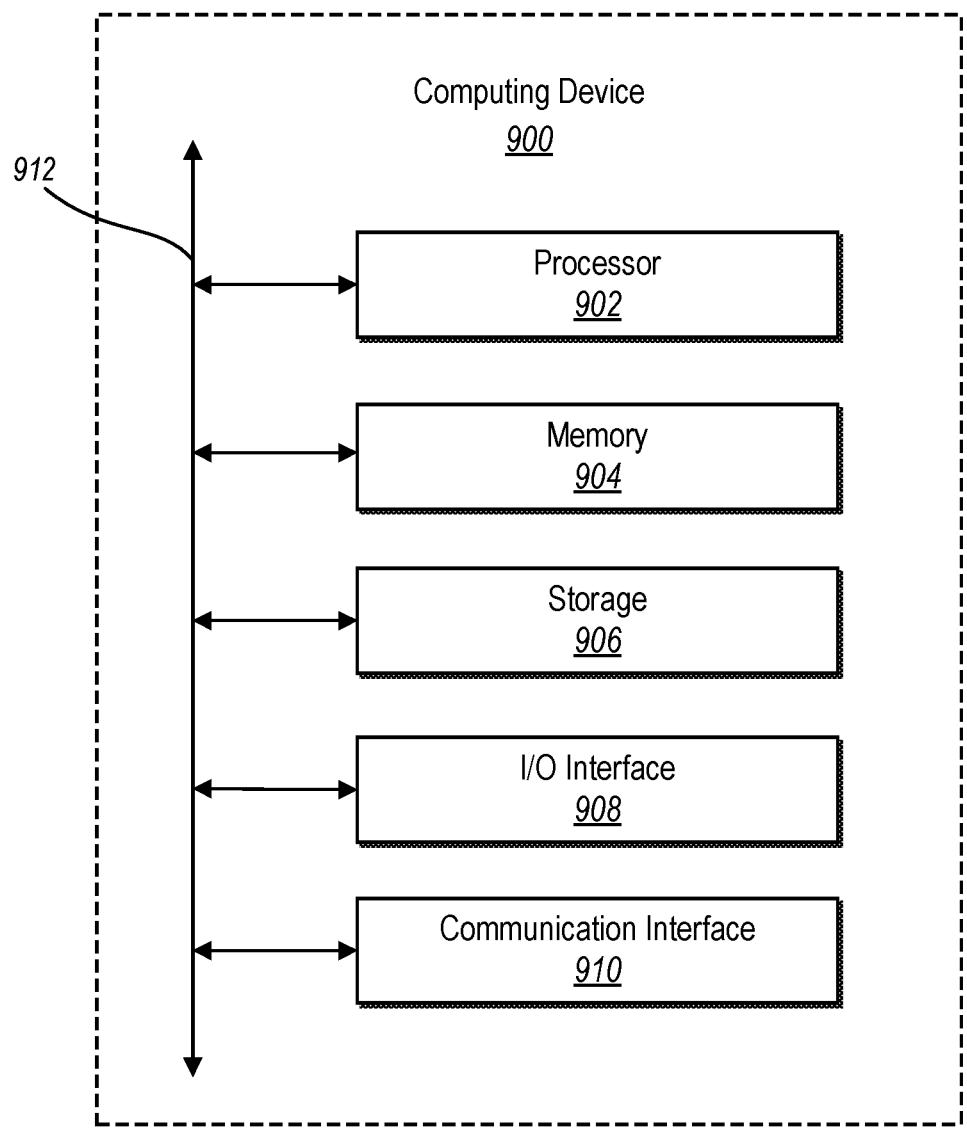
FIG. 9 illustrates a block diagram of an exemplary computing device in accordance with one or more embodiments.

FIG. 9 illustrates a block diagram of an exemplary computing device 900 that may be configured to perform one or more of the processes described above. One will appreciate that one or more computing devices, such as the computing device 900 may host the data science system 102, 600. Alternatively, the computing device 900 may include a device (e.g., 104, 304, 404) that communicates with the data science system 102, 600. In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device).

As shown by FIG. 9, the computing device 900 can comprise one or more processor(s) 902, memory 904, a storage device 906, an input/output ("I/O") interface 908, and a communication interface 910, which may be communicatively coupled by way of a communication infrastructure (e.g., bus 912). While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In particular embodiments, the processor(s) 902 includes hardware for executing instructions, such as those making up a computer program. As an example and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 includes a storage device 906 includes storage for storing data or instructions. As an example and not by way of limitation, storage device 906 can comprise a non-transitory storage medium described above. The storage device 906 may include a hard disk drive (HDD), flash memory, a Universal Serial Bus (USB) drive or a combination these or other storage devices.

The computing device 900 also includes one or more input I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause a computing device to:
   display, within a graphical user interface, a plurality of algorithms, wherein each algorithm of the plurality of algorithms comprises a data source schema;
   receive, based on user input, a selection of an algorithm from the plurality of algorithms;
   filter a plurality of data sources to display compatible data sources;
   receive, based on user input, a selection of a data source from the compatible data sources;
   generate a data science operation by pairing reusable algorithm building blocks from the selected algorithm with data from the selected data source; and
   execute the data science operation to generate a data science result.

2. The non-transitory computer-readable medium as recited in claim 1, wherein the instructions cause the computing device to filter the plurality of data sources by determining the compatible data sources from the plurality of data sources that have a data type matching the data type identified in an annotation of a descriptor of the selected algorithm.

3. The non-transitory computer-readable medium as recited in claim 1, further comprising instructions, that, when executed by the at least one processor, cause the computing device to:
   determine a tunable parameter in the data science operation; and
   modify the tunable parameter as part of pairing the reusable algorithm building blocks from the selected algorithm with data from the selected data source.

4. The non-transitory computer-readable medium as recited in claim 1, further comprising instructions, that, when executed by the at least one processor, cause the computing device to:
   generate a visualization of the data science result; and
   provide the visualization of the data science result via the graphical user interface.

5. In a digital environment for performing data science operations, a computer-implemented method of creating data science operations, the computer-implemented method comprising:
   displaying, within a graphical user interface on a computing device, a plurality of data sources and a plurality of algorithms;
   receiving a selection of an algorithm from the plurality of algorithms;
   identifying a data source schema for the selected algorithm;
   comparing a data type from the data source schema of the selected algorithm the plurality of data sources to identify compatible data sources having the data type;
   updating the graphical user interface to display the compatible data sources;
   receiving, based on user input, a selection of a compatible data source from the compatible data sources;
   generating a data science operation by pairing reusable algorithm building blocks from the selected algorithm with data from the selected compatible data source; and
   executing the data science operation to generate a data science result.

6. The computer-implemented method as recited in claim 5, further comprising:
   generating a visualization of the data science result; and
   providing the visualization of the data science result via the graphical user interface.

7. The computer-implemented method as recited in claim 5, wherein the data science operation is generated by injecting data from the selected compatible data source into the selected algorithm.

8. The computer-implemented method as recited in claim 5, further comprising:
   determining a tunable parameter in the data science operation; and
   modifying the tunable parameter as part of pairing the reusable algorithm building blocks from the selected algorithm with data from the selected compatible data source.

9. The computer-implemented method as recited in claim 5, further comprising parsing the data source schema for the selected algorithm to identify the data type.

10. The computer-implemented method as recited in claim 9, wherein generating the data science operation by pairing the reusable algorithm building blocks from the selected algorithm with data from the selected compatible data source comprises inserting data from the selected compatible data source into locations of the selected algorithm based on the data type and data structures of the reusable algorithm building blocks.

11. The computer-implemented method as recited in claim 10, wherein generating the data science operation by pairing the reusable algorithm building blocks from the selected algorithm with data from the selected compatible data source comprises combining multiple reusable algorithmic building blocks to form a single data science algorithm.

12. The computer-implemented method as recited in claim 5, further comprising:
- determining a tunable parameter in the data science operation;
- providing a prompt within the graphical user interface to modify the tunable parameter from a default value to a user-defined value; and
- wherein executing the data science operation comprises utilizing the user-defined value for the tunable parameter.

13. The computer-implemented method as recited in claim 12, further comprising providing, in the graphical user interface, a prompt to input a value for the tunable parameter to replace a null value of the tunable parameter.

14. In a digital environment for performing data science operations, a system of creating data science operations, the system comprising:
- at least one processor; and
- at least one non-transitory computer readable storage medium storing instructions thereon that, when executed by the at least one processor, cause the system to:
  - provide, via a graphical user interface, a list of data sources and a list of data science algorithms;
  - receive, based on user input, a selection of a data source from the list of data sources;
  - update the list of data science algorithms to display science algorithms that are compatible with the selected data source;
  - receive a selection of a compatible data science algorithm from the updated list of data science algorithms displaying compatible data science algorithms;
  - generate a data science operation by pairing data from the selected data source with the selected compatible data science algorithm;
  - execute the data science operation to generate a data science result; and
  - provide, via the graphical user interface, the data science result within the graphical user interface.

15. The system as recited in claim 14, wherein the instructions cause the system to provide, via the graphical user interface, the data science result within the graphical user interface by:
- generating a graphical visualization of the data science result; and
- providing the graphical visualization of the data science result via the graphical user interface.

16. The system as recited in claim 15, wherein the graphical visualization is a graph, chart, or plot of the data science result.

17. The system as recited in claim 14, further comprising instructions thereon that, when executed by the at least one processor, cause the system to:
- identify reusable algorithm building blocks from the selected compatible data science algorithm by identifying a component descriptor for the selected compatible data science algorithm that provides annotations facilitating paring the data from the selected data source with the selected compatible data science algorithm; and
- wherein the instructions cause the system to generate the data science operation by pairing data from the selected data source with the identified reusable algorithm building blocks from the selected compatible data science algorithm based on data the annotations of the selected compatible data science algorithm.

18. The system as recited in claim 17, wherein the instructions cause the system to generate the data science operation by inserting data from the selected data source into locations of the selected compatible data science algorithm based on a matching data type and data structures of the identified reusable algorithm building blocks.

19. The system as recited in claim 17, wherein the instructions cause the system to pair the data from the selected data source with the identified reusable algorithm building blocks by injecting data types from the selected data source into variables of the selected compatible data science algorithm that have matching data types.

20. The system as recited in claim 17, further comprising instructions thereon that, when executed by the at least one processor, cause the system to:
- receive an additional data source from another database;
- verify that data from the additional data source is compatible with the selected compatible data science algorithm;
- inject the data from the additional data source into the selected compatible data science algorithm; and
- update the data science operation to execute utilizing the data from the additional data source.

* * * * *